United States Patent
Matsushita et al.

(10) Patent No.: US 9,829,381 B2
(45) Date of Patent: Nov. 28, 2017

(54) SPECTROSCOPIC MEASUREMENT DEVICE, COMMUNICATION SYSTEM, AND COLOR MANAGEMENT SYSTEM

(71) Applicant: SEIKO EPSON CORPORATION, Tokyo (JP)

(72) Inventors: Tomonori Matsushita, Chino (JP); Akira Sano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 653 days.

(21) Appl. No.: 14/187,990

(22) Filed: Feb. 24, 2014

(65) Prior Publication Data
US 2014/0240708 A1    Aug. 28, 2014

(30) Foreign Application Priority Data
Feb. 25, 2013    (JP) .................. 2013-034264

(51) Int. Cl.
G01N 21/25    (2006.01)
G01J 3/51    (2006.01)
G01J 3/26    (2006.01)
G01J 3/46    (2006.01)

(52) U.S. Cl.
CPC . G01J 3/51 (2013.01); G01J 3/26 (2013.01); G01J 3/462 (2013.01)

(58) Field of Classification Search
CPC .. G01J 3/462; G01J 3/505; G01J 3/506; G01J 3/51; G09G 5/02; G06K 7/10; G06K 7/123; G06K 19/0614
See application file for complete search history.

(56) References Cited

U.S. PATENT DOCUMENTS

| | | | |
|---|---|---|---|
| 6,760,475 B1 * | 7/2004 | Miller | G01J 3/26 348/E9.01 |
| 7,913,922 B1 | 3/2011 | Roth | |
| 2002/0093509 A1 | 7/2002 | Murashita et al. | |

(Continued)

FOREIGN PATENT DOCUMENTS

CN    102645740 A    8/2012
CN    102798972 A    11/2012

(Continued)

*Primary Examiner* — Michael A Lyons
*Assistant Examiner* — Maurice Smith
(74) *Attorney, Agent, or Firm* — Oliff PLC

(57) ABSTRACT

A communication system includes a transmission terminal for displaying a color code having a plurality of colors of code patterns arranged two-dimensionally, and a spectroscopic measurement device including a variable wavelength interference filter for dispersing the light from the image displayed on the transmission terminal, an imaging section adapted to image the light dispersed by the variable wavelength interference filter to obtain a spectral image, a colorimetric section adapted to measure a dispersion spectrum of each of pixels in each of spectral images of a plurality of wavelengths with respect to the color code based on the light intensity value in each of the pixels, in the case in which the spectral images are obtained, and a decode section adapted to detect an arrangement of the code patterns based on the pixel positions and the dispersion spectrums of the respective pixels, and decode the color code.

13 Claims, 13 Drawing Sheets

(56) References Cited

U.S. PATENT DOCUMENTS

| | | | |
|---|---|---|---|
| 2005/0062753 A1 | 3/2005 | Kitazawa | |
| 2005/0264640 A1 | 12/2005 | Kitazawa | |
| 2007/0253008 A1* | 11/2007 | Edge | G01J 3/02 358/1.9 |
| 2008/0191035 A1 | 8/2008 | Cheon | |
| 2012/0120403 A1 | 5/2012 | Funamoto | |
| 2012/0212823 A1 | 8/2012 | Funamoto et al. | |
| 2012/0300208 A1 | 11/2012 | Sano et al. | |
| 2014/0192077 A1* | 7/2014 | Gomi | G09G 5/02 345/589 |
| 2014/0192357 A1 | 7/2014 | Sano | |
| 2014/0218735 A1 | 8/2014 | Tatsuda | |
| 2014/0293427 A1 | 10/2014 | Funamoto | |

FOREIGN PATENT DOCUMENTS

| | | |
|---|---|---|
| JP | A-10-173944 | 6/1998 |
| JP | A-2000-004938 | 1/2000 |
| JP | A-2000-331076 | 11/2000 |
| JP | A-2001-195536 | 7/2001 |
| JP | A-2003-189020 | 7/2003 |
| JP | A-2004-020400 | 1/2004 |
| JP | A-2005-091005 | 4/2005 |
| JP | A-2005-091327 | 4/2005 |
| JP | A-2005-339185 | 12/2005 |
| JP | B2-3738147 | 1/2006 |
| JP | A-2007-104319 | 4/2007 |
| JP | A-2007-166526 | 6/2007 |
| JP | B2-4038930 | 1/2008 |
| JP | A-2008-533552 | 8/2008 |
| JP | B2-4136114 | 8/2008 |
| JP | 2009-271675 A | 11/2009 |
| JP | A-2010-203825 | 9/2010 |
| JP | 2011-238107 A | 11/2011 |
| JP | A-2012-033033 | 2/2012 |
| JP | 2012-103208 A | 5/2012 |
| JP | 2012-181591 A | 9/2012 |
| JP | A-2014-132237 | 7/2014 |
| JP | A-2014-153066 | 8/2014 |
| WO | WO 2006/093376 A1 | 9/2006 |

* cited by examiner

SPECTROSCOPIC MEASUREMENT DEVICE, COMMUNICATION SYSTEM, AND COLOR MANAGEMENT SYSTEM

BACKGROUND

1. Technical Field

The present invention relates to a spectroscopic measurement device, a communication system, and a color management system.

2. Related Art

In the past, there has been proposed a communication method using a color code arranged two-dimensionally as a type of wireless communication (see, e.g., JP-A-2001-195536 (Document 1)).

In Document 1, there is disclosed a code image (a color code) having a plurality of cells arranged. The code image is generated by encoding information, and differs in arrangement and depth of the color in accordance with the content of the information. In Document 1, the information is obtained by reading the code image, namely the color code, output therefrom using a scanner, a CCD, or the like as a three-band color image, and then decoding the color code using the result.

Incidentally, in the case of reading such a color code as described in Document 1 as a color image using the scanner or the like and then decoding the color code, the amount of information, which can be treated, can be increased by increasing the number of colors, and thus, the communication rate can be increased. On the other hand, in the case of increasing the number of colors, it is required to accurately identify the color of the color code.

However, in Document 1, there is used a configuration of obtaining the color image using a color filter corresponding to RGB, and in order to accurately identify the color, roughly three through eight colors are normally used. Therefore, in the case of increasing the number of colors of the color code in order to increase the communication rate, there is a possibility that the color cannot accurately be identified, and thus an accurate datum fails to be obtained.

SUMMARY

An advantage of some aspects of the invention is to provide a spectroscopic measurement device, a communication system, and a color management system using the same each capable of increasing the communication rate in wireless communication.

A spectroscopic measurement device according to an aspect of the invention includes a spectral filter capable of dispersing light emitted from an object to select light with a predetermined wavelength, and capable of changing the wavelength of the light to be selected, an imaging section adapted to image the light dispersed by the spectral filter to obtain a spectral image, a colorimetric section adapted to measure a dispersion spectrum of each of pixels in spectral images of a plurality of wavelengths with respect to a color code having a plurality of colors of code patterns, which are emitted from the object, arranged two-dimensionally, in a case in which the spectral images are obtained, and a decode section adapted to detect an arrangement of the code patterns based on information from the dispersion spectrum of each of the pixels, and decode the color code.

In the aspect of the invention, the light emitted from the object (e.g., an image display device capable of outputting a variety of images), and from the color code formed of the code patterns arranged two-dimensionally is dispersed by the spectral filter, and is then imaged, and thus, the spectral image is obtained at each of a plurality of wavelengths. Then, the measurement result including the light intensity values and the wavelengths in each of the pixels of the spectral image so as to be associated with each other, namely the dispersion spectrum in each of the pixels, is obtained. By measuring the dispersion spectrum of each of the pixels is measured in such a manner as described above, the colors of the respective code patterns of the color code can be identified, and thus, it becomes possible to decode the color code.

In the data communication using such a color code, the number of colors can be measured at the same time while identifying the colors, and the number of colors can be displayed at the same time, and therefore, improvement in the communication rate can be achieved.

Further, since the information cannot be obtained unless the color code is imaged, the information can be prevented from being obtained by the general public without notice. Therefore, the person who obtains the information can be noticed at a glance, and thus, the confidentiality of the information can be ensured.

Further, in the aspect of the invention, the spectral image with respect to each of the wavelengths of the color code is obtained using a spectral filter, and the color of each of the code patterns is identified based on the dispersion spectrum of each of the pixels of the spectral image. In such a configuration, the dispersion spectrum can accurately be detected compared to the related art configuration using, for example, the color filters of the three colors of RGB. Therefore, it becomes possible to accurately identify the colors, which cannot be identified using only the related art color filters of RGB, as the display colors of each of the code patterns of the color code based on the dispersion spectrum, and thus, the data amount of the data transmitted using the color code can dramatically be increased.

In the spectroscopic measurement device according to the aspect of the invention, it is preferable that the color code emitted from the object changes in colors of the code patterns every predetermined time, the colorimetric section measures the dispersion spectrum of each of the pixels with respect to each of the color codes changed every predetermined time, and the decode section decodes datum corresponding to each of the color codes based on the information from the dispersion spectrum of each of the pixels with respect to each of the color codes.

In this configuration, the color code is displayed on the object such as a display as a video picture, and the code patterns change every predetermined time. Meanwhile, the spectroscopic measurement device measures each of the color patterns changing every predetermined time, and then decodes the datum corresponding to each of the color patterns. Thus, transmission of a datum with a large data size, continuous transmission of a plurality of data, and so on become possible.

In the spectroscopic measurement device according to the aspect of the invention, it is preferable that the spectroscopic measurement device further includes a color difference determination section adapted to determine whether or not a difference between dispersion spectrums corresponding to respective reference color patches of a plurality of colors is determinable in a case in which the imaging section obtains the spectral images of a plurality of wavelengths corresponding to a reference color pattern including the reference color patches emitted from the object, and the colorimetric section measures the dispersion spectrums of the respective pixels of the spectral images.

In this configuration, the spectroscopic measurement device obtains the dispersion spectrum corresponding to each of the reference color patches, and then determines whether or not the difference between the dispersion spectrums is determinable. Thus, in the case in which there is a possibility that the dispersion spectrums of the respective color patches and the respective code patterns displayed by the image display device cannot be identified, the possibility can previously be detected. Therefore, the possibility that an error occurs when decoding the color code can be detected in advance.

In the spectroscopic measurement device according to the aspect of the invention, it is preferable that the color difference determination section determines that a first dispersion spectrum measured with respect to a first reference color patch and a second dispersion spectrum measured with respect to a second reference color patch are indistinguishable from each other in a case in which a difference in a light intensity of each of the wavelengths between the first dispersion spectrum and the second dispersion spectrum is one of equal to and smaller than a determination threshold, and the color difference determination section decreases the determination threshold by a predetermined value in a case in which it is determined that the difference between the dispersion spectrums corresponding to the respective reference color patches is indeterminable.

In this configuration, in the case in which the light intensity difference in each of the wavelengths between the two dispersion spectrums is equal to or smaller than the determination threshold, there is a possibility that the difference between the two dispersion spectrums cannot be determined, and therefore, the two dispersion spectrums are determined to be indistinguishable from each other. Further, in the case in which the difference between the dispersion spectrums corresponding to the respective color patterns is indeterminable, the determination threshold value is decreased by a predetermined value. Thus, the determination accuracy of the dispersion spectrum is enhanced, and it is possible to determine the dispersion spectrum, which has failed to be determined.

In the spectroscopic measurement device according to the aspect of the invention, it is preferable that there is further included a filter control section adapted to control the spectral filter to switch the wavelength of the light to be selected by the spectral filter at predetermined change intervals, and the filter control section decreases the change intervals by a predetermined length in a case in which the color difference determination section determines that the difference between the dispersion spectrums corresponding to the respective reference color patches is indeterminable.

In this configuration, in the case in which the difference between the dispersion spectrums corresponding to the respective color patterns is indeterminable, the change intervals of the selection wavelength is decreased as described above. Thus, the spectral images can be obtained at smaller wavelength intervals than that of the spectral images, which are used for obtaining the dispersion spectrums used when determining the difference to be indeterminable, and thus, more detailed dispersion spectrums can be obtained.

In the spectroscopic measurement device according to the aspect of the invention, it is preferable that the color difference determination section detects the dispersion spectrums having a determinable difference from each other, and outputs pixel positions of the reference color patches corresponding to the dispersion spectrums having the determinable difference from each other to the object.

In this configuration, in the case in which the difference between the dispersion spectrums corresponding to the respective color patterns is indeterminable, it is possible to notify the object (e.g., the image display device) of the pixel positions of the reference color patches corresponding to the dispersion spectrums having the determinable difference from each other. Therefore, the object (the image display device) can detect the corresponding reference color patches based on the pixel positions. Thus, by using the detection result, the object (the image display device) can display the color code using the colors corresponding to the reference color patches, which the spectroscopic measurement device can identify.

In the spectroscopic measurement device according to the aspect of the invention, it is preferable that the spectral filter is a variable wavelength interference filter provided with a first reflecting film and a second reflecting film disposed so as to be opposed to the first reflecting film, and adapted to cause interference in incident light entering an area between the first reflecting film and the second reflecting film to select the light with the predetermined wavelength.

In this configuration, the spectral filter is formed of the variable wavelength interference filter, which is a variable wavelength etalon (a variable wavelength Fabry-Perot etalon) for making the incident light entering the space between the first reflecting film and the second reflecting film interfere with each other to thereby transmit the light with a specific wavelength. Such a variable wavelength interference filter can be miniaturized compared to the spectroscopic element such as an acousto-optic tunable filter (AOTF) or liquid crystal tunable filters (LCTF), and can easily be incorporated into the spectroscopic measurement device.

In the spectroscopic measurement device according to the aspect of the invention, it is preferable that the spectroscopic measurement device further includes a telecentric optical system adapted to guide the incident light to the spectral filter.

In this configuration, since the telecentric optical system is provided, the incident light can be guided in the direction perpendicular to the spectral filter, and the miniaturization of the device can be achieved. In particular, in the case of using the variable wavelength interference filter as the spectral filter, it is necessary to guide the incident light so as to be perpendicular to each of the reflecting films. Therefore, by providing the telecentric optical system, a spectroscopic measurement device capable of performing high-speed and highly accurate integral-field spectroscopy can be provided.

In the spectroscopic measurement device according to the aspect of the invention, it is preferable that the imaging section images each of the code patterns with a plurality of pixels.

In this configuration, the light from one of the code patterns is received (imaged) using a plurality of pixels of the imaging element. Thus, the variation in color reproducibility between dots and the pixels in the image display device and the variation in light receiving sensitivity of the imaging element can be averaged, and the S/N ratio can be improved.

A communication system according to another aspect of the invention includes an image display device including a color code output section adapted to output a color code having a plurality of colors of code patterns arranged two-dimensionally, and a spectroscopic measurement device including a spectral filter capable of dispersing light from an image displayed on the image display device to select light with a predetermined wavelength, and capable of changing the wavelength of the light to be selected, an imaging section adapted to image the light dispersed by the spectral filter to obtain a spectral image, a colorimetric section adapted to measure a dispersion spectrum of each of pixels in spectral images of a plurality of wavelengths with respect to the color code, in a case in which the spectral images are obtained, and a decode section adapted to detect an arrangement of the code patterns based on information from the dispersion spectrum of each of the pixels, and decode the color code.

Similarly to the spectroscopic measurement device described above, in the aspect of the invention, by measuring the dispersion spectrum of each of the pixels is measured in such a manner as described above, the colors of the respective code patterns of the color code can be identified, and thus, it becomes possible to decode the color code.

In the data communication using such a color code, the number of colors can be measured at the same time while identifying the colors, and the number of colors can be displayed at the same time, and therefore, improvement in the communication rate can be achieved.

Further, since the information cannot be obtained unless the color code displayed is imaged, the information can be prevented from being obtained by the general public without notice. Therefore, the person who obtains the information can be noticed at a glance, and thus, the confidentiality of the information can be ensured.

Further, the dispersion spectrum can accurately be detected compared to the related art configuration using, for example, the color filters of the three colors of RGB, and it becomes possible to accurately identify the colors, which cannot be identified using only the related art color filters of RGB, based on the dispersion spectrum, and thus, the data amount of the data transmitted using the color code can dramatically be increased.

In the communication system according to the aspect of the invention, it is preferable that the image display device includes a reference pattern output section adapted to output a reference color pattern including a plurality of colors of reference color patches, and the spectroscopic measurement device includes a color difference determination section adapted to determine whether or not a difference between dispersion spectrums corresponding to the respective reference color patches is determinable in a case in which the colorimetric section measures the dispersion spectrums of the respective pixels of the spectral images.

In this configuration, the spectroscopic measurement device obtains the dispersion spectrum corresponding to each of the color patterns output by the image display device, and then determines whether or not the difference between the dispersion spectrums is determinable. Thus, in the case in which there is a possibility that the dispersion spectrums of the respective color patches and the respective code patterns output by the image display device cannot be identified, the possibility can previously be detected. Therefore, the possibility that an error occurs when decoding the color code can be detected in advance.

In the communication system according to the aspect of the invention, it is preferable that the spectroscopic measurement device outputs a display color change request for making the display color be changed to the image display device in a case in which the color difference determination section determines that the difference between the dispersion spectrums corresponding to the respective reference color patches is indeterminable, and the reference pattern output section decreases the number of the reference color patches displayed in the reference color pattern in response to input of the display color change request.

In this configuration, in the case in which the difference between the dispersion spectrums corresponding to the respective color patterns is indeterminable, the spectroscopic measurement device outputs the display color change request for changing the display colors to the image display device, and the image display device decreases the number of reference color patches displayed in accordance with the display color change request. Thus, the setting of the image display device can be changed so as to display the color patterns with which the dispersion spectrums can be identified by the spectroscopic measurement device.

Further, in the aspect of the invention, there can be displayed the reference color patches with which the dispersion spectrums can be identified by the spectroscopic measurement device.

In the communication system according to the aspect of the invention, it is preferable that the color difference determination section detects the dispersion spectrums having a determinable difference from each other, and outputs pixel positions of the reference color patches corresponding to the dispersion spectrums having the determinable difference from each other to the image display device, and the color code output section outputs the color code constituting the code patterns with the same colors as the colors of the reference color patches corresponding to the dispersion spectrums distinguishable from each other.

In this configuration, in the case in which the difference between the dispersion spectrums corresponding to the respective color patterns is indeterminable, the spectroscopic measurement device outputs the pixel positions where the distinguishable dispersion spectrums are obtained, namely the pixel positions corresponding to the distinguishable reference color patches, to the image display device. The image display device can detect the distinguishable reference color patches based on the pixel positions.

Further, by displaying the color code formed of the code patterns with the same colors as those of the distinguishable reference color patches thus detected, the color code, which can be decoded by the spectroscopic measurement device, can be displayed.

A color management system according to still another aspect of the invention includes a spectroscopic measurement device including a spectral filter capable of dispersing light from an image displayed on an image display device to select light with a predetermined wavelength, and capable of changing the wavelength of the light to be selected, an imaging section adapted to image the light dispersed by the spectral filter to obtain a spectral image, a colorimetric section adapted to measure a dispersion spectrum of each of pixels in spectral images of a plurality of wavelengths with respect to one of a color code having a plurality of colors of code patterns arranged two-dimensionally, and a color pattern for generating a profile, the color pattern having a plurality of colors of color patches arranged two-dimensionally, in a case in which the imaging section obtains the spectral images displayed on the image display device, a decode section adapted to detect an arrangement of the code patterns based on information from the dispersion spectrum of each of the pixels with respect to the color code, and decode the color code, and a data output section adapted to output profile-generating datum having the dispersion spectrums corresponding to the color patterns and the pixel positions, where the dispersion spectrums are measured, so as to be associated with each other, and a profile generation device including a pattern output section adapted to make the image display device display the color code and the color patterns, and a profile generation section adapted to generate a profile of the image display device using the profile-generating datum output from the spectroscopic measurement device, the color code represents a datum obtained by coding a datum including an address of the profile generation device, and the data output section outputs the profile-generating datum to the address, which can be obtained by the decode section decoding the color code.

In the aspect of the invention, the profile generation device makes the image display device display the color code representing the address of the profile generation device. The spectroscopic measurement device measures the color code, measures the dispersion spectrum of each of the pixels, and then decodes the color code to obtain the address. Then, when outputting the profile-generating datum obtained separately to the profile generation device, the spectroscopic measurement device establishes the connection to the profile generation device using the address described above. The profile generation device generates the profile of the image display device using the profile-generating datum.

Thus, it is possible to easily establish the wireless communication between arbitrary spectroscopic measurement device and profile generation device without previously setting the communication between the spectroscopic measurement device and the profile generation device or connecting the spectroscopic measurement device and the profile generation device to each other with wire.

Further, a number of colors can simultaneously be measured, and thus, reduction of the time necessary for the measurement and the generation of the profile can be achieved.

Further, since the measurement datum is the accurate dispersion spectrum of the image displayed by the image display device, the profile generation device can generate the profile with high color reproducibility with respect to the original image using such measurement data. Further, as described above, since the colorimetric process in the spectroscopic measurement device can promptly be performed, the time necessary to generate the profile can also be reduced.

In the color management system according to the aspect of the invention, it is preferable that the spectroscopic measurement device obtains the profile-generating datum and the address based on a plurality of spectral images corresponding to the color code and the color patterns displayed at the same time in respective areas different from each other.

Further, in this configuration, since a number of colors can be measured at the same time, it is possible to display the color code and the color patterns at the same time, and measure the color code and the color patterns at the same time. Therefore, since the colorimetry in the spectroscopic measurement device can promptly be performed, the time necessary to generate the profile can also be reduced.

In the color management system according to the aspect of the invention, it is preferable that the pattern output section outputs the color patterns and the color code at respective timings different from each other, and further outputs an identification image adapted to identify the color patterns and the color code, and the spectroscopic measurement device is provided with an identification image detection section adapted to detect the identification image, and identifies the color code and the color patterns in accordance with the detection result.

In this configuration, by displaying the identification images used for identifying the color pattern and the color code, it is possible to correctly identify whether the image displayed presently is the color pattern used for generating the profile or the color code for the communication, and thus, the process corresponding to the type of the image can correctly be performed.

BRIEF DESCRIPTION OF THE DRAWINGS

The invention will now be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.

Configuration of Communication System

Figure 1:
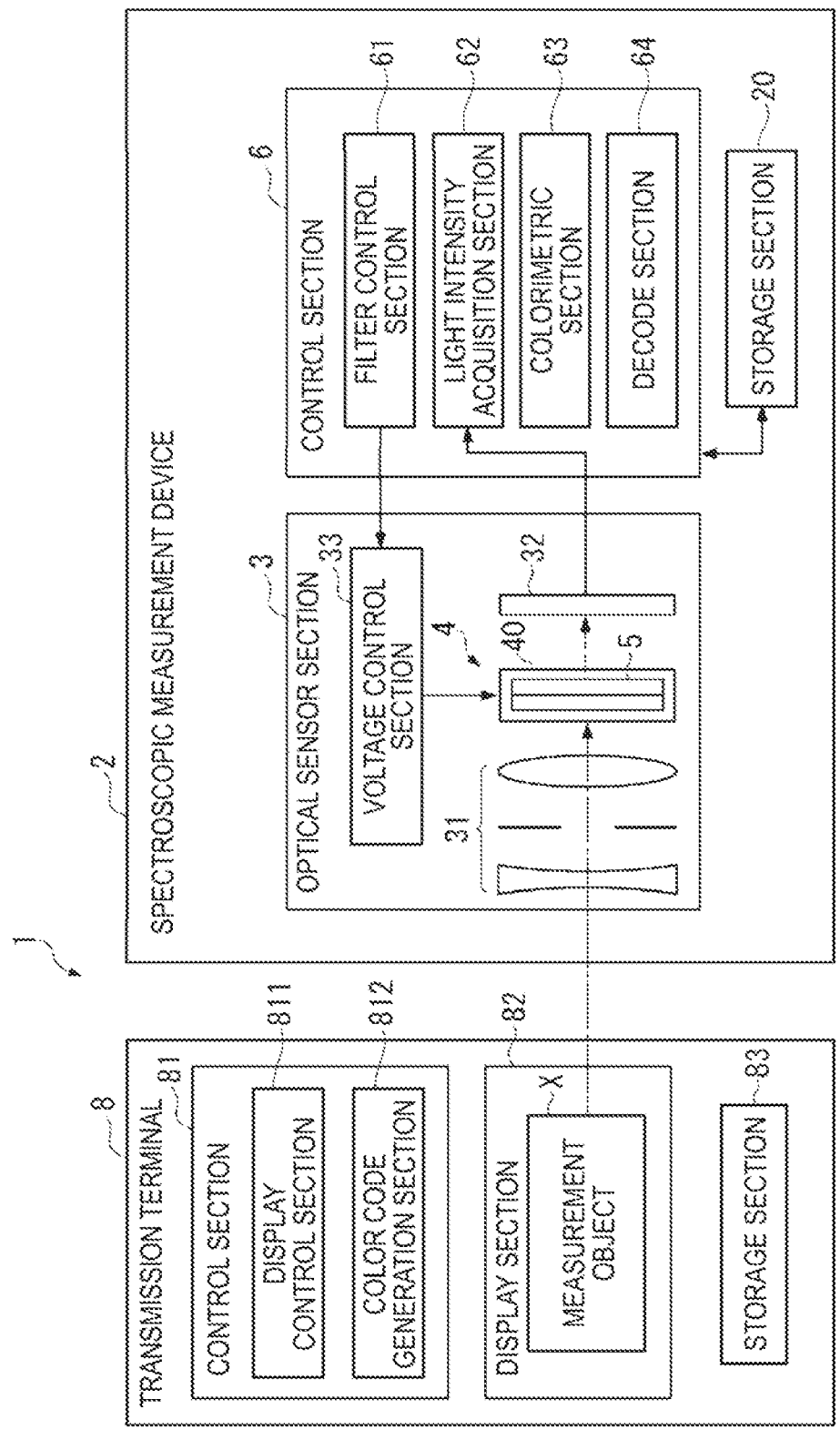
FIG. 1 is a block diagram showing a schematic configuration of a communication system according to a first embodiment of the invention.

FIG. 1 is a block diagram showing a schematic configuration of a communication system 1 and a spectroscopic measurement device 2 according to the first embodiment of the invention.

The communication system 1 is provided with the spectroscopic measurement device 2 as a terminal on the reception side, and a transmission terminal 8, and performs transmission of information using a color code between these terminals.

The spectroscopic measurement device 2 takes the spectral image of a color code displayed on a display section 82 of the transmission terminal 8, then obtains a colorimetric result of the color code from the spectral image, and then decodes the color code.

Configuration of Transmission Terminal

The transmission terminal 8 is provided with a control section 81, a display section 82, and a storage section 83, and encodes a transmission target datum (hereinafter referred to as a transmission datum) as a two-dimensional color code and then makes the display section 82 display the transmission datum. The transmission terminal 8 corresponds to an image display device according to the invention and a target object according to the invention.

The control section 81 is provided with a display control section 811 and a color code generation section 812.

The display control section 811 controls the display content of the display section 82.

The color code generation section 812 converts the transmission datum into the two-dimensional color code, and in other words, encodes the transmission datum. The color code generation section 812 corresponds to a color code output section according to the invention.

The display section 82 can be a variety of types of display such as a liquid crystal display, a plasma display, or an organic EL display.

The storage section 83 previously stores a variety of data and programs for controlling the transmission terminal 8, and the transmission datum described above.

Configuration of Spectroscopic Measurement Device

As shown in FIG. 1, the spectroscopic measurement device 2 is provided with an optical sensor section 3 for taking an image of the measurement target light from a measurement object X, a control section 6 for controlling the spectroscopic measurement device 2, and a storage section 20. The control section 6 is realized by a variety of types of hardware constituents such as a CPU and a memory. The spectroscopic measurement device 2 takes the image of the color code as the measurement object X to obtain a spectral image, then obtains the dispersion spectrum of each of the pixels of the color code from the spectral image as the measurement result, and then decodes the measurement result to thereby obtain the transmission datum.

Configuration of Optical Sensor Section

The optical sensor section 3 is provided with a optical filter device 4 configured to incorporate the variable wavelength interference filter 5 inside a housing 40, a telecentric optical system 31 for guiding the measurement target light to the variable wavelength interference filter 5, an imaging element 32 for receiving the light transmitted through the variable wavelength interference filter 5, and a voltage control section 33 for varying the wavelength of the light to be transmitted through the variable wavelength interference filter 5.

Configuration of Variable Wavelength Interference Filter

Figure 2:
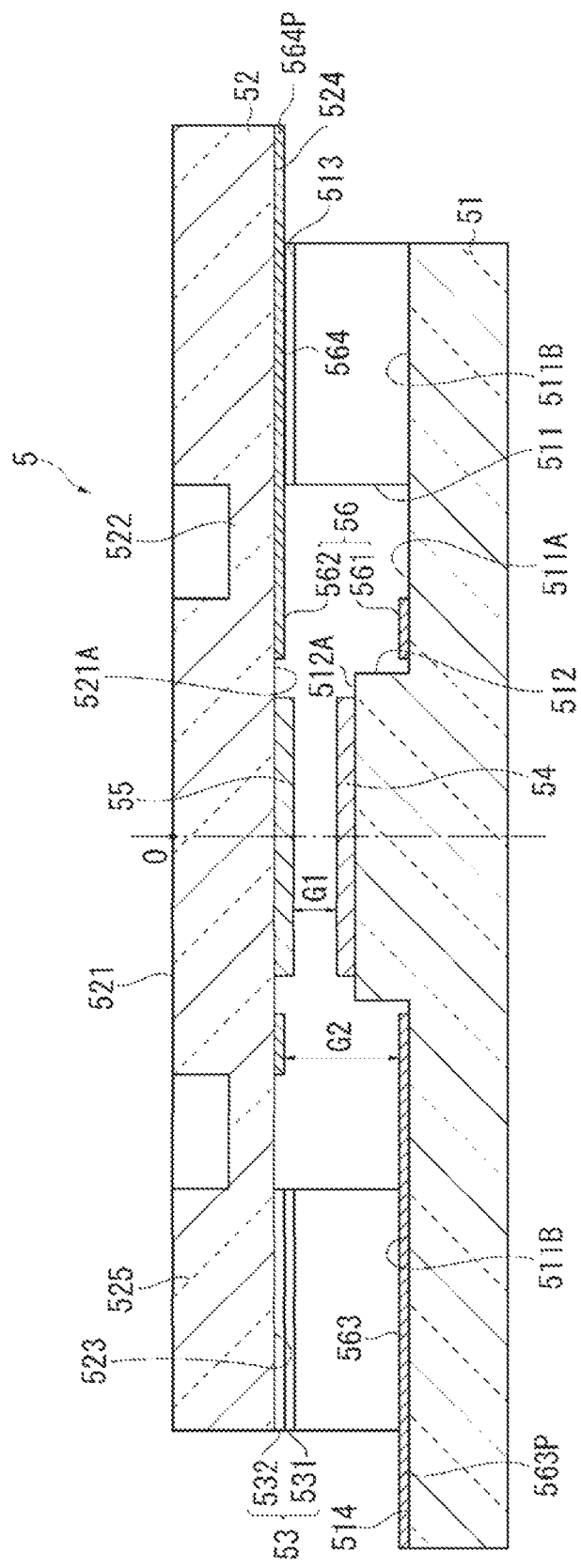
FIG. 2 is a cross-sectional view showing a schematic configuration of a variable wavelength interference filter.

FIG. 2 is a cross-sectional view showing a schematic configuration of the variable wavelength interference filter 5.

The variable wavelength interference filter 5 is housed in the housing 40, and the inside of the housing 40 becomes an enclosed space kept in a vacuum environment (or an environment with reduced pressure lower than an atmospheric pressure). As shown in FIG. 2, the variable wavelength interference filter 5 is provided with a stationary substrate 51 as a first substrate according to the invention, and a movable substrate 52 as a second substrate according to the invention. The stationary substrate 51 and the movable substrate 52 are configured integrally by bonding a first bonding section 513 of the stationary substrate 51 and a second bonding section 523 of the movable substrate 52 to each other with bonding films 53 (a first bonding film 531 and a second bonding film 532) each formed of, for example, a plasma polymerized film including siloxane as a principal component.

It should be noted that in the explanation below, the plan view viewed from the thickness direction of the stationary substrate 51 or the movable substrate 52, namely the plan view of the variable wavelength interference filter 5 viewed from the stacking direction of the stationary substrate 51, the bonding films 53, and the movable substrate 52, is referred to as a filter plan view.

In the filter plan view, one-side side of the stationary substrate 51 projects from the movable substrate 52 to the outside. In the projected portion, a surface, which is exposed when viewing the variable wavelength interference filter 5 from the movable substrate 52 side, constitutes a first electrical component installation surface 514.

Further, in the filter plan view, among the sides of the movable substrate 52, one-side side opposed to the first electrical component installation surface 514 projects from the stationary substrate 51 to the outside. In the projected portion, a surface, which is exposed when viewing the variable wavelength interference filter 5 from the stationary substrate 511 side, constitutes a second electrical component installation surface 524.

The stationary substrate 51 is provided with an electrode arrangement groove 511 and a reflecting film installation section 512. The stationary substrate 51 is formed to have a thickness dimension larger than that of the movable substrate 52, and no deflection of the stationary substrate 51 occurs due to the electrostatic attractive force when applying a voltage between a stationary electrode 561 and a movable electrode 562, or the internal stress of the stationary electrode 561.

The electrode arrangement groove 511 is formed to have a ring-like shape cantered on the center point O of the variable wavelength interference filter 5 in the filter plan view. The reflecting film installation section 512 is formed so as to protrude toward the movable substrate 52 from the central portion of the electrode arrangement groove 511 in the plan view described above. Here, the bottom surface of the electrode arrangement groove 511 forms an electrode installation surface 511A on which the stationary electrode 561 is disposed. Further, the projection tip surface of the reflecting film installation section 512 forms a reflecting film installation surface 512A, and is provided with a stationary reflecting film 54.

Further, the stationary substrate 51 is provided with electrode extraction grooves 511B respectively extending from the electrode arrangement groove 511 toward the first electrical component installation surface 514 and the second electrical component installation surface 524.

The electrode installation surface 511A of the electrode arrangement groove 511 is provided with the stationary electrode 561. The stationary electrode 561 is disposed in a partial area of the electrode installation surface 511A, the area being opposed to the movable electrode 562 of a movable section 521 described later.

Further, the stationary substrate 51 is provided with a stationary extraction electrode 563 extending from the outer peripheral edge of the stationary electrode 561 to the first electrical component installation surface 514 through the electrode extraction groove 511B having a ring-like shape. An extension tip section of the stationary extraction electrode 563 constitutes a stationary electrode pad 563P in the first electrical component installation surface 514.

It should be noted that although in the present embodiment, there is shown a configuration of providing the single stationary electrode 561 to the electrode installation surface 511A, it is also possible to adopt, for example, a configuration (a dual electrode configuration) having two concentric electrodes centered on the planar center point O.

Further, the surface of the stationary substrate 51, which is opposed to the movable substrate 52, and on which either of the electrode arrangement groove 511, the reflecting film installation section 512, and the electrode extraction grooves 511B is not formed, constitutes the first bonding section 513. The first bonding section 513 is provided with the first bonding film 531, and by bonding the first bonding film 531 to the second bonding film 532 provided to the movable substrate 52, the stationary substrate 51 and the movable substrate 52 are bonded to each other as described above.

The movable substrate 52 is provided with the movable section 521 having a circular shape centered on the planar center point O in the filter plan view, a holding section 522 disposed outside the movable section 521 and for holding the movable section 521, and a substrate peripheral section 525 disposed outside the holding section 522.

The movable section 521 is formed to have a thickness dimension larger than that of the holding section 522. The movable section 521 is formed to have a diameter larger than at least the diameter of the outer peripheral edge of the reflecting film installation surface 512A in the filter plan view. Further, the movable section 521 is provided with the movable electrode 562 and the movable reflecting film 55, which is a second reflecting film according to the invention.

The movable electrode 562 is opposed to the stationary electrode 561 via the inter-electrode gap G2, and is formed to have a ring-like shape, which is the same shape as that of the stationary electrode 561. Further, the movable substrate 52 is provided with a movable extraction electrode 564 extending from the outer peripheral edge of the movable electrode 562 toward the second electrical component installation surface 524. An extension tip section of the movable extraction electrode 564 constitutes a movable electrode pad 564P in the second electrical component installation surface 524.

The movable reflecting film 55 is disposed at the central portion of a movable surface 521A of the movable section 521 so as to be opposed to the stationary reflecting film 54 via an inter-reflecting film gap G1.

The holding section 522 is a diaphragm surrounding the periphery of the movable section 521, and is formed to have a thickness dimension smaller than that of the movable section 521. Such a holding section 522 is easier to be deflected than the movable section 521, and it becomes possible to displace the movable section 521 toward the stationary substrate 51 with a weak electrostatic attractive force.

As described above, the substrate peripheral section 525 is disposed outside the holding section 522 in the filter plan view. The surface of the substrate peripheral section 525 opposed to the stationary substrate 51 is provided with the second bonding section 523 opposed to the first bonding section 513. Further, the second bonding section 523 is provided with the second bonding film 532, and as described above, by bonding the second bonding film 532 to the first bonding film 531, the stationary substrate 51 and the movable substrate 52 are bonded to each other.

Configuration of Telecentric Optical System, Imaging Element, and Voltage Control Section The telecentric optical system 31 is an optical system for guiding the incident light to the variable wavelength interference filter 5, and is composed of a plurality of optical components such as a lens. The telecentric optical system 31 emits the incident light so as to have the principal ray parallel to the optical axis, and perpendicular to the stationary substrate 51 of the variable wavelength interference filter 5.

The imaging element 32 is disposed so as to be located on the focal plane of the telecentric optical system 31. The measurement target light emitted from the measurement object X is guided by the telecentric optical system 31, and is imaged in the imaging element 32. The imaging element 32 is provided with a plurality of detection elements (not shown) arranged in an array. These detection elements are formed of photoelectric conversion elements such as charge coupled device (CCD) elements or CMOS elements, and generate electric signals corresponding to the light intensity of the light received, then output the electric signals to a light intensity acquisition section 62 described later.

The voltage control section 33 applies a drive voltage corresponding to a wavelength (a measurement wavelength) of the light to be transmitted through the variable wavelength interference filter 5 to the variable wavelength interference filter 5 in accordance with the control by a filter control section 61 described later.

Configuration of Storage Section and Control Section

The storage section 20 stores various programs and various data for controlling the spectroscopic measurement device 2. The data correspond to, for example, V-λ datum representing the wavelength of the transmitted light with respect to the drive voltage applied to an electrostatic actuator 56, and information (e.g., a measurement starting wavelength, a changing interval of the wavelength, and a measurement ending wavelength) related to the measurement wavelength when measuring the measurement object X. Further, the storage section 20 stores the intensity of the received light obtained by the light intensity acquisition section 62 as the spectral image associated with the pixel positions (coordinate values) of the respective detection elements and the measurement wavelength when detected.

The control section 6 is provided with the filter control, section 61, the light intensity acquisition section 62, a colorimetric section 63, and a decode section 64. The variety of control sections provided to the control section 6 are configured by appropriately combining operational circuits, memories, a variety of electric circuits, and so on.

The filter control section 61 obtains a voltage value (an input value) of a drive voltage corresponding to the measurement wavelength based on the V-λ datum stored in the storage section 20, and then outputs the voltage value thus obtained to the voltage control section 33 to thereby vary the distance of the gap of the variable wavelength interference filter 5.

Further, the filter control section 61 performs detection of a change timing of the measurement wavelength, a change of the measurement wavelength, a change of the drive voltage corresponding to the change in the measurement wavelength, a determination of the end of the measurement, and so on based on the variety of data stored in the storage section 20, and controls the voltage control section 33 based on the determination.

The light intensity acquisition section 62 obtains the received light intensity of the transmitted light for each of the detection elements of the imaging element 32 to thereby obtain the spectral image. The spectral image having the pixel position and the received light intensity corresponding to each other is made to be associated with the measurement wavelength when detected, and is stored in the storage section 20. It should be noted that the imaging element 32 and the light intensity acquisition section 62 correspond to an imaging section according to the invention.

The colorimetric section 63 obtains the light intensity value of each of the pixels from the spectral image obtained by the spectroscopic measurement device 2, associates the pixel position, the light intensity value, and the measurement wavelength with each other, and then stores the result in the storage section 20 as a measurement result. Then, the colorimetric section 63 coordinates the measurement results of the respective measurement wavelengths to generate a colorimetric result as the dispersion spectrum in each of the pixel positions, and then stores the colorimetric result in the storage section 20.

The decode section 64 obtains the dispersion spectrum of the color code from the storage section 20 and then decodes the color code based on the dispersion spectrum thus obtained to thereby obtain the transmission datum.

Action of Communication System

Figure 3:
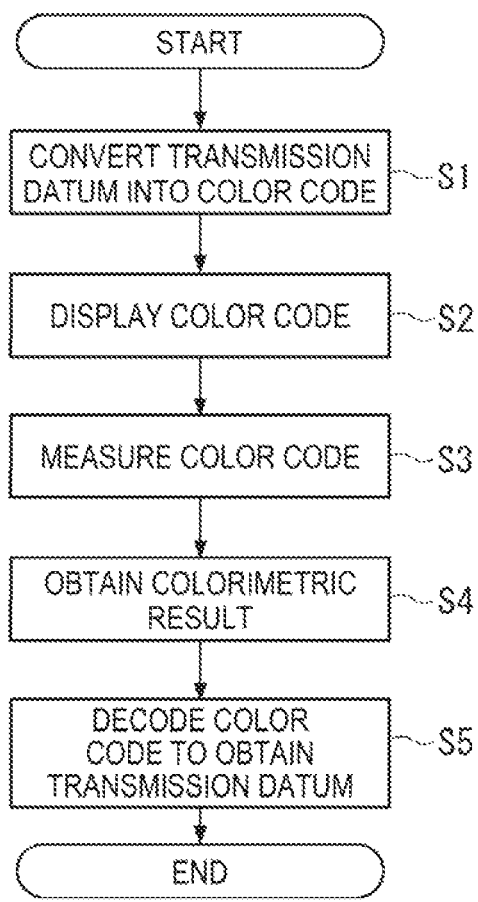
FIG. 3 is a flowchart showing a process of the communication system.

FIG. 3 is a flowchart showing an action of the communication system 1.

As shown in FIG. 3, when the transmission datum is selected by an operation by the user, and the transmission terminal 8 receives an instruction of data transmission, the color code generation section 812 converts (step S1) the transmission datum into the color code.

Subsequently, the transmission terminal 8 displays (step S2) the color code thus generated on the display section 82.

Figure 4:
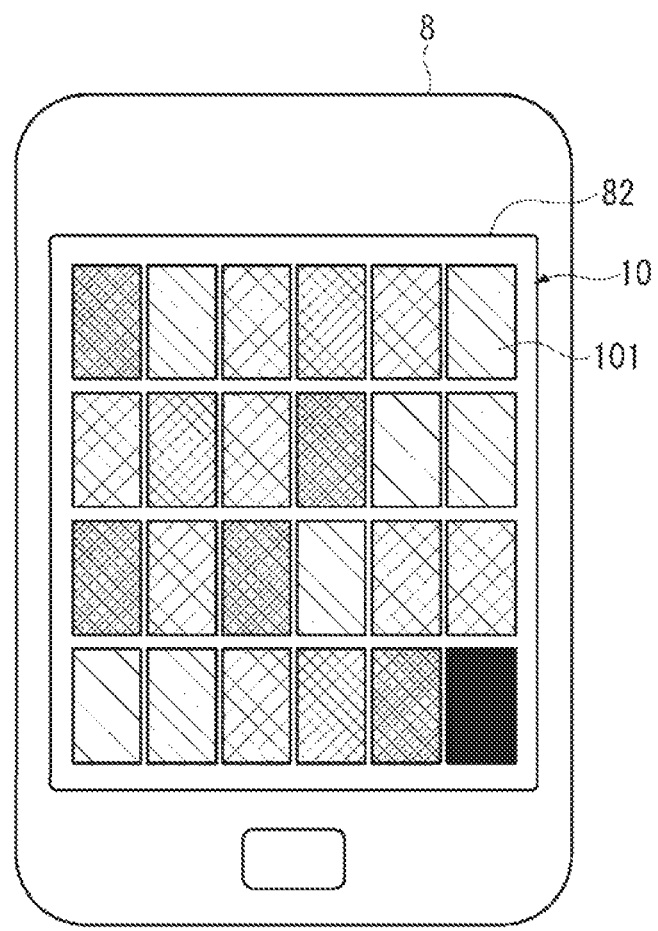
FIG. 4 is a front view for explaining an example of display on a transmission terminal.

FIG. 4 shows an example of the transmission terminal 8 displaying the color code 10 on the display section 82.

The color code 10 is a three-dimensional code configured by arranging a plurality of colors of code patterns 101 two-dimensionally in a matrix, and representing the information with the color and the arrangement. The color code shown in FIG. 4 includes 4×6, 24 code patterns as an example. It should be noted that a white color as a reference color is displayed between the plurality of code patterns 101.

It should be noted that in the case in which the display section 82 is capable of displaying an image with 256 grayscales in each of the R, G, and B colors, 16,777,216 colors, namely 24-bit information, can be displayed by one code pattern 101.

In reality, in the case of, for example, making the numerical values 0 through 15 correspond to 16 types of dispersion spectrum to display 16 types of code patterns 101, and at the same time arranging that n code patterns 101 are displayed in one color code 10, 16n pieces of information can be displayed by one color code 10 in a separated manner. Further, by sequentially displaying a plurality of color codes 10, a larger amount of information can be displayed.

Going back to FIG. 3, when the color code 10 is displayed on the display section 82, the spectroscopic measurement device 2 measures (step S3) the color code 10 in accordance with the operation of the user. Specifically, when the spectroscopic measurement device 2 receives the measurement instruction by the user, the filter control section 61 controls the voltage control section 33 so as to apply the drive voltage corresponding to the measurement wavelength. When the voltage control section 33 applies the drive voltage described above to the electrostatic actuator 56, the inter-reflecting film gap G1 is changed to the dimension corresponding to the drive voltage. Then, the light with the measurement wavelength corresponding to the inter-reflecting film gap G1 is transmitted through the variable wavelength interference filter 5, and detected by the imaging element 32, and thus, the light intensity acquisition section 62 obtains the spectral image of the measurement wavelength. The spectral image thus obtained is stored in the storage section 20 so as to be associated with the measurement wavelength. The spectroscopic measurement device 2 performs the measurement at all of the measurement wavelengths, namely performs the measurement while changing the measurement wavelength until the spectral image is obtained.

It should be noted that when the spectroscopic measurement device 2 measures the color code 10 displayed on the display section 82, the measurement can also be performed in the state in which the spectroscopic measurement device 2 is separated from the display section 82, or the state in which the spectroscopic measurement device 2 is closely attached to the display section 82.

When obtaining the spectral images at all of the measurement wavelengths, the colorimetric section 63 obtains the dispersion spectrum (the color information of each of the pixels) in each of the pixel positions as the measurement result using the pixel positions (the coordinates) obtained from each of the spectral images thus obtained and then stored in the storage section 20, the light intensity values at the pixel positions, and the measurement wavelengths (the measurement wavelengths of the spectral images thus obtained), and then stores the measurement result in the storage section 20 (step S4).

Then, the decode section 64 decodes the color code 10 with reference to the dispersion spectrum in the pixel positions corresponding to each of the code patterns 101 of the color code 10 using the measurement result of each of the pixel positions thus obtained to thereby obtain (step S5) the transmission datum. The spectroscopic measurement device 2 stores the transmission datum thus obtained in the storage section 20.

In the present embodiment, one code pattern is detected with a plurality of pixels of the imaging element 32. The decode of the color code 10 in the present embodiment is performed in, for example, the following procedure.

Specifically, the position (e.g., an edge) of each of the code patterns is first detected. Then, the pixels having the entire area included in the position of the code pattern are detected from the pixels (i.e., the detection elements) of the imaging element 32. By obtaining the average value of the dispersion spectrum in the pixels thus detected, the dispersion spectrum (the color information) of the code pattern including the pixels is obtained. The decode of the color code 10 is performed using the dispersion spectrum of each of the code patterns obtained in such a manner.

It should be noted that since the method of such related art as described in, for example, JP-T-2008-533552 can be used in the decode of the color code using the dispersion spectrum of the code pattern thus obtained, the explanation thereof will be omitted here.

Functions and Advantages of First Embodiment

In the communication system 1 and the spectroscopic measurement device 2 according to the present embodiment, the light from the color code 10, which is formed by arranging the code patterns 101 two-dimensionally, is dispersed and then imaged, and thus, the spectral image is obtained in each of the plurality of wavelengths. The dispersion spectrum in each of the pixels of the color code 10 is obtained based on the spectral image, the color of each of the code patterns 101 can be identified based on the dispersion spectrum thus obtained, and thus, the decode of the color code 10 becomes possible.

Thus, the spectroscopic measurement device 2 can measure the number of colors at the same time while identifying the colors, and display the number of colors on the transmission terminal 8 at the same time, and therefore, improvement in the communication rate can be achieved.

Here, in the case of displaying the color code 10 using each pixel of the display section 82 as one code pattern, the communication rate can be calculated as (the number of colors per pixel)×(the number of pixels)×(display rate). Hereinafter, the communication rate will be explained in detail.

Number of Colors Per Pixel

For example, general image display devices are capable of expressing each of the R, G, and B colors with 256 grayscales. Therefore, the number of colors which can be expressed by one pixel is up to 16,777,216, and 24-bit information can be expressed by one pixel it should be noted that there is a possibility that in the future, the number of grayscales and the number of colors are increased to make it possible to express a larger amount of information than, for example, 32 bits or 48 bits.

Number of Pixels

In the general image display devices, the XGA (786,432 pixels) and the FWXGA (1,024,000 pixels) predominate as the number of pixels. However, the number of pixels is increasing yearly, and those adopting the QXGA (3,145,728 pixels) exist at present.

Display Rate

The display rate, namely the display rate of a monitor is 60 Hz at lowest, and in this case, the display time of one color code 10 is 16.6 ms. It is assumed that the colorimetry is performed within this time frame.

The result obtained by roughly calculating the communication rate using the values described above, and then comparing the communication rate with the case of the infrared communication will be shown in Table 1 described below. As shown in Table 1, dramatic improvement in the communication rate can be achieved compared to the case of using the infrared communication. Further, the improvement in the communication rate can be expected in the future.

It should be noted that in Table 1 described below, the communication rate of the infrared communication is described assuming that the value described outside the parenthesis is the present value, and the value inside the parenthesis is a future value, wherein the present value is obtained with reference to IrSimple, and the future value is obtained with reference to a theoretical value of UFIR. Further, the present value of the communication rate of the communication using the color code 10 is in the case in which the number of pixels corresponds to the XGA, and the future value is in the case in which the number of pixels corresponds to the QXGA.

TABLE 1

| COMMUNI-CATION TYPE | INFRARED COMMUNI-CATION | COLOR CODE (PRESENT VALUE) | COLOR CODE (FUTURE VALUE) |
|---|---|---|---|
| NUMBER OF PIXELS | — | 786,432 (XGA) | 3,145,728 (QXGA) |
| NUMBER OF COLORS (bit) | — | 24 | 32 |
| COMMUNI-CATION RATE (Mbps) | 4 (100) | 1,132 | 60,398 |

Further, in the communication system 1 and the spectroscopic measurement device 2 according to the present embodiment, since it is necessary to image the color code 10 displayed, the person who obtains the information can be noticed at a glance. Therefore, the information can be prevented from being obtained by the general public without notice, and thus, the confidentiality of the information can be ensured.

Further, some wireless communication is not available in the place where an influence is exerted on the human body or the equipment. However, the communication system 1 according to the present embodiment performs the communication using the electromagnetic wave in the visible range, and therefore, does not have the restriction described above, and is available in any places.

Further, some wireless communication systems may have the communication frequency band in common with each other (e.g., Bluetooth (a registered trademark) and a wireless LAN), and in such a case, the communication rate might dramatically be decreased due to the interference. In contrast, in the communication using the color code of the present embodiment, such a restriction of the interference as described above does not exist, and the decrease in the communication rate can be suppressed.

Further, in the communication system 1 according to the present embodiment, the spectral image with respect to each of the wavelengths of the color code 10 is obtained using a spectral filter, and the color of each of the code patterns 101 is identified based on the dispersion spectrum of each of the pixels of the spectral image. In such a configuration, the dispersion spectrum can accurately be detected compared to the related art configuration using, for example, the color filters of the three colors of RGB. Therefore, it becomes possible to accurately identify the colors, which cannot be identified using only the related art color filters of RGB, as the display colors of each of the code patterns 101 of the color code 10 based on the dispersion spectrum, and thus, the data amount of the datum transmitted using the color code 10 can dramatically be increased.

In the communication system 1 and the spectroscopic measurement device 2 according to the present embodiment, since the color code 10 has the plurality of code patterns 101 arranged two-dimensionally in a matrix, the position of the code pattern 101 in the color code 10 can easily be identified.

Further, in the communication system 1 according to the present embodiment, the light from one code pattern 101 is received (imaged) by the plurality of pixels of the imaging element. Thus, the variation in color reproducibility between dots and the pixels in the image display device and the variation in light receiving sensitivity of the imaging element 32 can be averaged, and the S/N ratio can be improved.

Further, the pixels having the entire area included in the position of the code pattern 101 are detected among the pixels of the imaging element 32. Then, by obtaining the average value of the dispersion spectrum in all of the pixels thus detected, the dispersion spectrum (the color information) of the code pattern 101 including all of the pixels in the imaging position is obtained. Thus, it is possible to average the variation in light receiving intensity, and at the same time, obtain the dispersion spectrum of the code pattern 101 with higher accuracy.

In the spectroscopic measurement device 2 according to the present embodiment, there is provided the variable wavelength interference filter 5 as a variable wavelength etalon (a variable wavelength Fabry-Perot etalon). The variable wavelength interference filter 5 can be miniaturized compared to the spectroscopic element such as an acousto-optic tunable filter (AOTF) or liquid crystal tunable filters (LCTF), and can easily be incorporated into the spectroscopic measurement device.

According to the spectroscopic measurement device 2 of the present embodiment, since the telecentric optical system 31 is provided, the incident light can be guided in the direction perpendicular to the spectral filter, and the miniaturization of the device can be achieved. In particular, in the case of using the variable wavelength interference filter as the spectral filter, it is necessary to guide the incident light so as to be perpendicular to each of the reflecting films. Therefore, by providing the telecentric optical system 31, a spectroscopic measurement device 2, which is capable of performing high-speed and highly accurate integral-field spectroscopy, and can be miniaturized, can be provided.

Second Embodiment

Then, a second embodiment of the invention will be explained with reference to the accompanying drawings.

Figure 5:
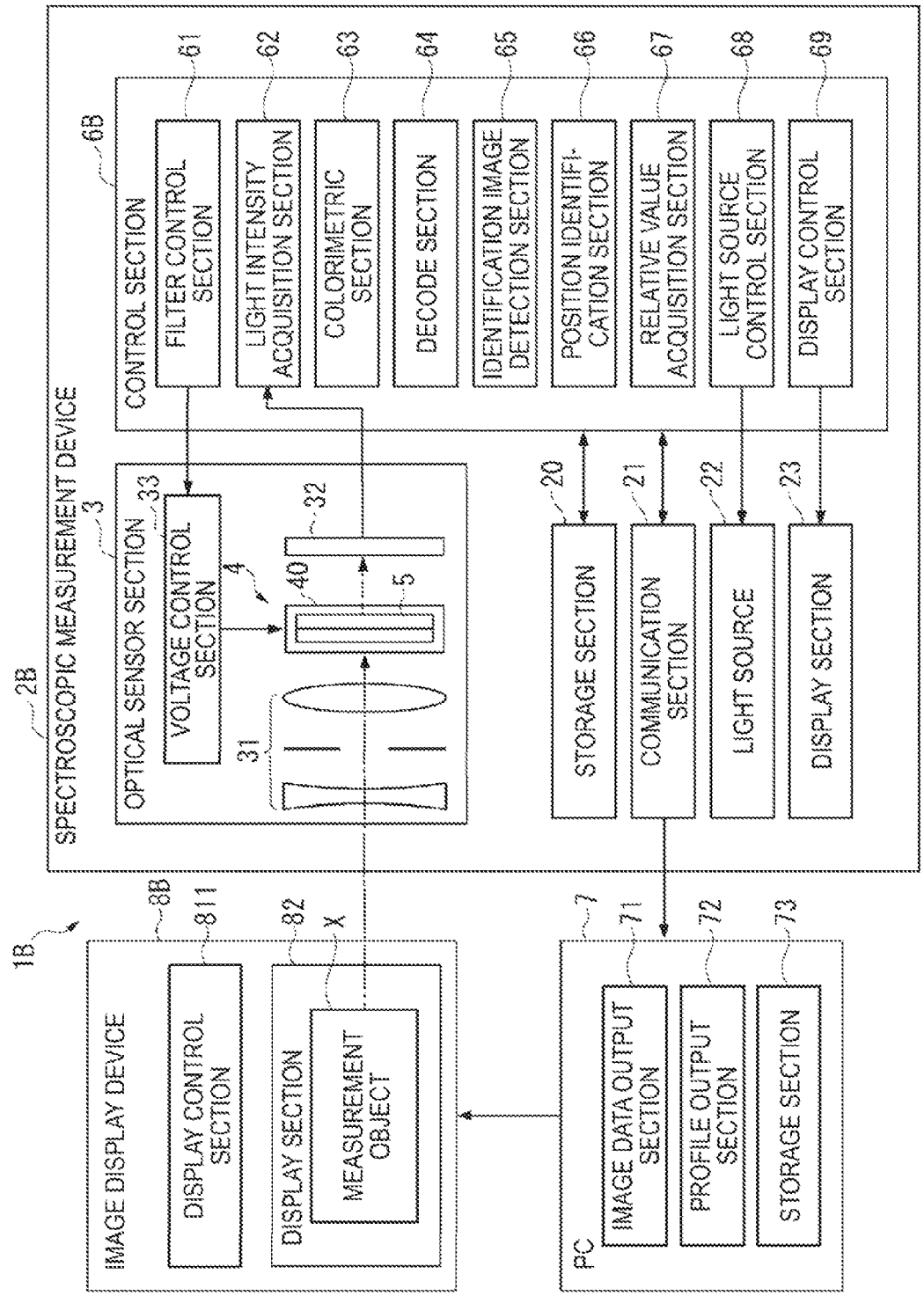
FIG. 5 is a block diagram showing a schematic configuration of a color management system according to a second embodiment of the invention.

FIG. 5 is a block diagram showing a schematic configuration of a color management system 1B according to the second embodiment of the invention. It should be noted that in the following explanation, the constituents substantially the same as those of the first embodiment are denoted with the same reference symbols, and the explanation thereof will be omitted or simplified.

Similarly to the spectroscopic measurement device 2 described as the first embodiment, the color management system 1B according to the present embodiment is provided with a spectroscopic measurement device 2B capable of decoding the color code 10, and a PC 7 as a profile generation device. In the color management system 1B, connection information (the address of the PC 7) for connecting the spectroscopic measurement device 2B to the PC 7 so as to be able to communicate with each other is defined as the transmission datum, which is the original datum of the color code 10. Further, the spectroscopic measurement device 2B decodes the color code 10 displayed on the image display device 8B to thereby obtain the connection information, and then establishes the connection with the image display device 8B using the connection information. Further, the spectroscopic measurement device 2B obtains profile-generating datum of the image display device 8B, and then transmits the profile-generating datum to the PC 7. The PC 7 generates the profile of the image display device 8B using the profile-generating datum.

Configuration of PC

The PC 7 is provided with an image datum output section 71, a profile output section 72, and a storage section 73, and is configured so as to be able to communicate with the spectroscopic measurement device 2B and the image display device 8B.

The image datum output section 71 outputs the image datum for making the display section 82 display the measurement object X to the image display device 8B.

It should be noted that the measurement object X is, for example, a color pattern used for generating the profile of the image display device 8B, or the color code 10 representing the connection information for connecting the spectroscopic measurement device 2B to the image display device 8B so as to be able to communicate with each other. The image datum of the measurement object X can also be stored in advance in the storage section 73, or can also be generated using a program and a variety of data stored in the storage section 73. For example, it is also possible for the image data output section 71 to encode the connection information stored in the storage section 73 into the color code 10, and then output the color code 10.

It should be noted that it is also possible to arrange that a color code generation section for encoding the connection information is disposed, and the image data output section 71 outputs the color code 10 thus encoded.

The profile output section 72 generates the profile of the image display device 8B using the measurement datum of the measurement object X, which is measured by the spectroscopic measurement device 2B. Further, the profile output section 72 outputs the profile thus generated to the image display device 8B.

The image data output section 71 and the profile output section 72 described above are realized by an operational circuit including a CPU, a ROM, a RAM, and so on provided to the PC 7 reading and then executing a program stored in the storage section 73.

The storage section 73 stores the program and a variety of data for executing the process performed by the image data output section 71 and the profile output section 72.

It should be noted that the PC 7 is provided with an input section not shown such as a keyboard or a mouse, and acts in accordance with an operation of the input section by the user. Further, the PC 7 is provided with a communication section not shown formed of a variety of communication devices for performing the wireless and wired communication with the spectroscopic measurement device 2B, and is capable of communicating with the spectroscopic measurement device 2B.

The image display device 8B, which is a target of the generation of the profile, is provided with a display control section 811 and the display section 82. In the present embodiment, the display control section 811 performs a color adjustment of the display section 82 using the profile generated by the color management system 1B. It should be noted that the image display device 8B is different from the transmission terminal 8 of the first embodiment in the point that the display control section 811 performs the adjustment and the point that the color code generation section is not provided, but has a basically similar configuration to that of the transmission terminal 8 of the first embodiment.

Configuration of Spectroscopic Measurement Device

Figure 6:
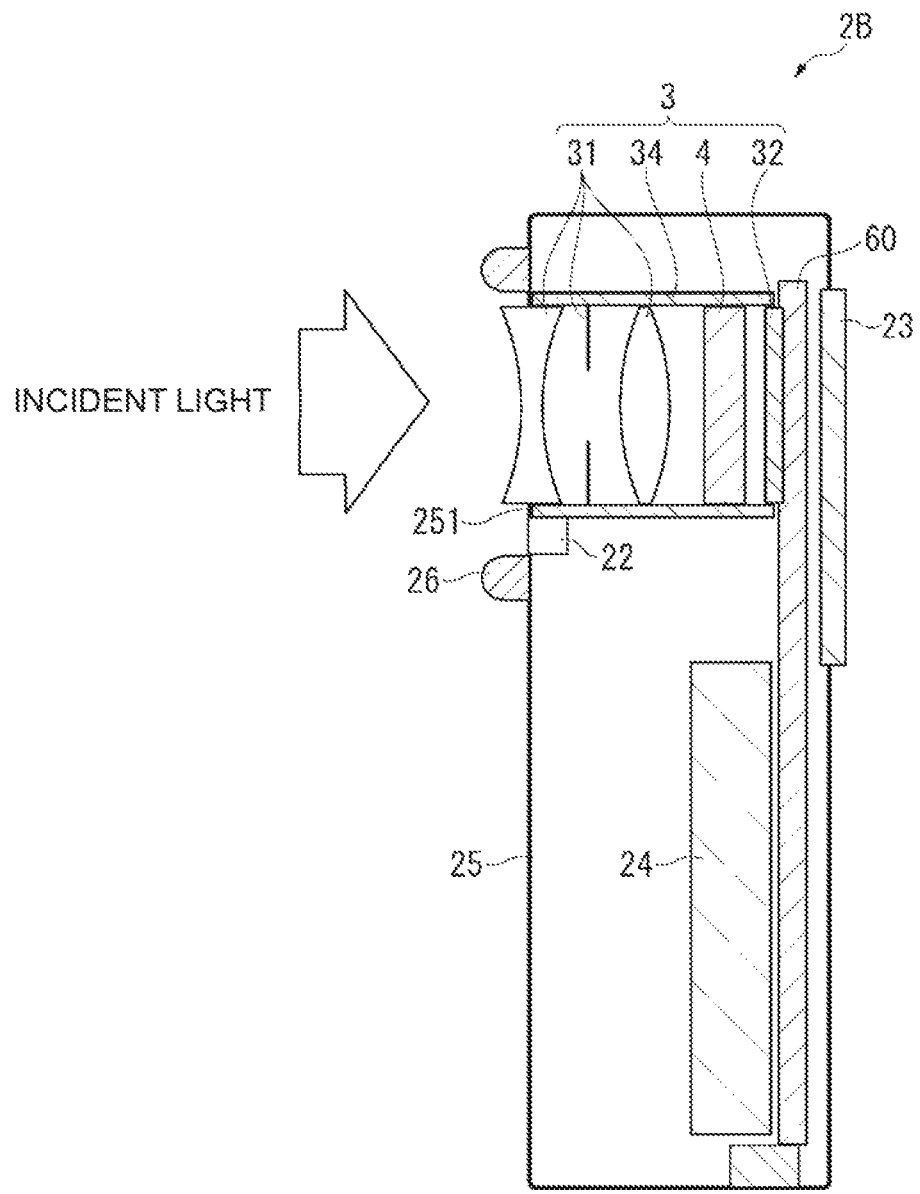
FIG. 6 is a cross-sectional view showing a schematic configuration of a spectroscopic measurement device according to the embodiment.

FIG. 6 is a cross-sectional view showing a schematic configuration of the spectroscopic measurement device 2B.

As shown in FIGS. 5 and 6, the spectroscopic measurement device 2B is provided with the optical sensor section 3, a control section 6B for controlling the spectroscopic measurement device 2B, the storage section 20, a communication section 21, a light source 22, a display section 23, and a battery 24, wherein a circuit board 60 provided with the optical sensor section 3 and the control section 6B, the light source 22, and the battery 24 are housed in an exterior case 25, and the display section 23 is installed in an installation section provided to the exterior case 25.

The exterior case 25 is provided with a light entrance port 251 for taking the measurement target light into the optical sensor section 3, and a pressure-contact section 26 is disposed on the periphery of the light entrance port 251. The pressure-contact section 26 is a member having a light-blocking property, which is formed of an elastic member, deforms to adhere to the display section 82 without a gap when pressed against the display section 82 of the image display device 8B, and thus inhibits the outside light other than the measurement target light from entering the light entrance port 251. Further, the pressure-contact section 26 has a black surface, and is configured to be able to inhibit the light from being reflected by the surface.

The light source 22 is a light source for emitting white light and violet light such as an LED, and is disposed in an area, which is located on the periphery of the light entrance port 251 of the exterior case 25, and surrounded by the pressure-contact section 26. In the case in which the measurement object X is drawn on a medium not emitting light such as paper, the light source 22 emits light toward the measurement object X, and the spectroscopic measurement device 2B measures the reflected light.

The display section 23 is one of a variety of types of display devices such as a liquid crystal display or an organic EL display, and is installed in the installation section provided to the exterior case 25 across the circuit board 60 from the imaging element 32. The display section 23 displays, for example, a notification image for informing the user of the operation state of the spectroscopic measurement device 2B, the measurement result, and so on.

The battery 24 is a power supply for supplying the spectroscopic measurement device 2B with electric power, and is a secondary cell configured to be able to be charged by a charging circuit not shown. It should be noted that it is also possible for the spectroscopic measurement device 2B to be configured to be able to be connected to an external device such as a portable terminal device such as a smartphone or a cellular phone, or the PC 7, and to be supplied by the external device with the electric power.

An optical component housing 34 is a housing for housing the optical sensor section 3, and has the optical filter device 4, the telecentric optical system 31, and the imaging element 32 arranged at predetermined positions. The imaging element 32 is disposed in an end portion of the optical component housing 34, the end portion being located on the circuit board 60 side, the optical components constituting the telecentric optical system 31 are disposed in an end portion located on an opposite side, and the end portion located on the opposite side is connected to the light entrance port 251 provided to the exterior case 25.

The communication section 21 outputs the measurement datum as the measurement result of the measurement object X by the spectroscopic measurement device 2B and the relative values calculated by a relative value acquisition section 67 to the PC 7 as the profile-generating datum. The communication section 21 is configured so as to be able to communicate with the PC 7 using a variety of types of wireless communication such as Wi-Fi (a registered trademark), Bluetooth (a registered trademark), or infrared communication. It should be noted that the storage section 20 and the communication section 21 correspond to a data output section according to the invention.

Configuration of Control Section

The control section 6B is provided with the filter control section 61, the light intensity acquisition section 63, the colorimetric section 63, the encode section 64, an identification image detection section 65, a position identification section 66, a relative value acquisition section 67, a light source control section 68, and a display control section 69. The control section 6B is configured by appropriately combining operational circuits, memories, a variety of electric circuits, and so on provided to the circuit board 60. It should be noted that the storage section 20 is also provided to the circuit board 60.

The filter control section 61, the light intensity acquisition section 62, the colorimetric section 63, and the decode section 64 are substantially the same as those in the first embodiment.

The identification image detection section 65 detects an identification image representing the fact that the color code 10 and the color patterns are displayed on the display section 82. In other words, in the case in which the identification image is displayed, the identification image detection section 65 detects the fact that the image presently displayed is the identification image based on the received light intensity in each of the pixel positions detected by the imaging element 32 and the spectral image obtained by the light intensity acquisition section 62. Thus, the fact that the display of the color code 10 and the color patterns is started is detected.

The position identification section 66 identifies the pixel positions, where the reference color (e.g., a white color) is displayed, and the pixel positions, where color patches are displayed, from the measurement datum formed of the spectral images of the respective measurement wavelengths obtained by the light intensity acquisition section 62. The identification of the pixel positions is performed by identifying the color of each of the pixel positions from the pattern of the received light intensity of the measurement datum of each of the pixel positions.

The relative value acquisition section 67 calculates the relative value between each of the color patterns and the measurement data taking the reference color datum (the measurement datum of white displayed on the display section 82), which is obtained by measuring the identification image, as a reference.

The light source control section 68 controls lighting and extinction of the light source 22 in accordance with an instruction of the user.

The display control section 69 controls the display content of the display section 23. As the display content, for example, a notification image for informing the user of the operation state of the spectroscopic measurement device 2B, the measurement result, and so on can be cited.

Action of Color Management System

Figure 7:
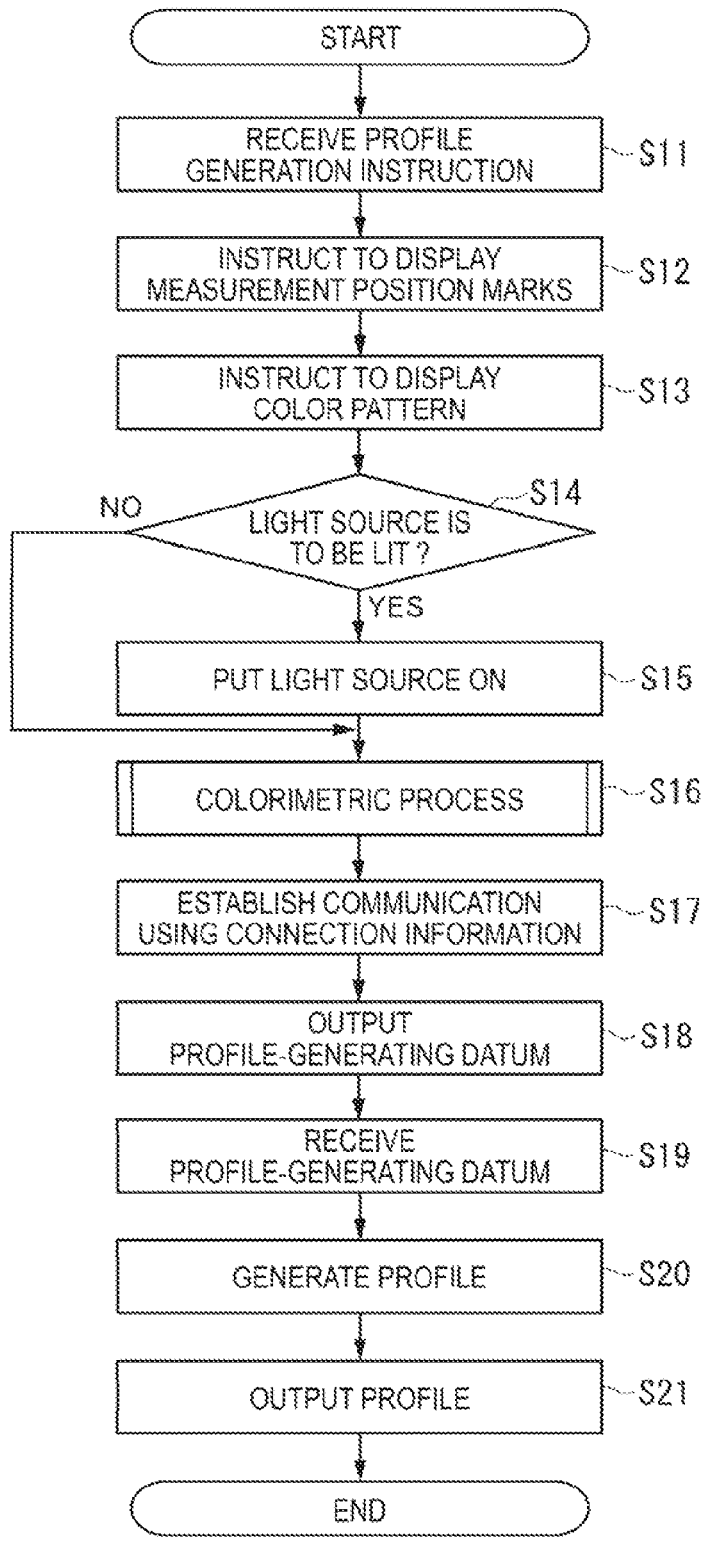
FIG. 7 is a flowchart showing a process of the color management system.

FIG. 7 is a flowchart showing an action of the color management system 1B.

Figure 8:
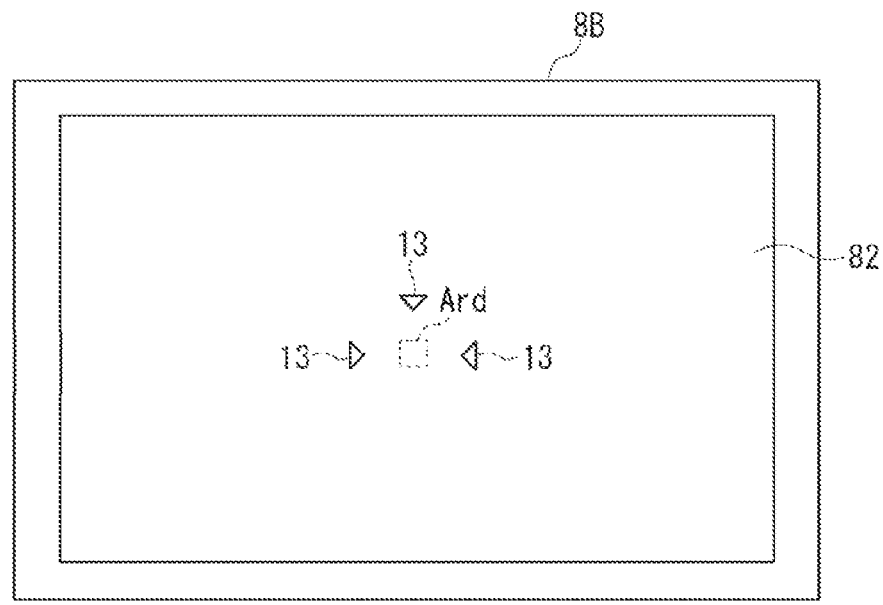
FIG. 8 is a front view for explaining a display configuration of an image display device.

As shown in FIG. 7, when the PC 7 receives (step S11) a profile generation instruction by the user, the image data output section 71 makes (step S12) the display section 82 of the image display device 8B display measurement position marks 13 for indicating the arrangement positions of the spectroscopic measurement device 2B as shown in FIG. 8. It should be noted that in FIG. 8, the display area Ard where the measurement object X is displayed is indicated by a dotted line. The measurement position marks 13 are marks each having a triangular shape, and disposed so as to surround the display area of the measurement object X, namely the imaging area of the spectroscopic measurement device 28.

Figure 9:
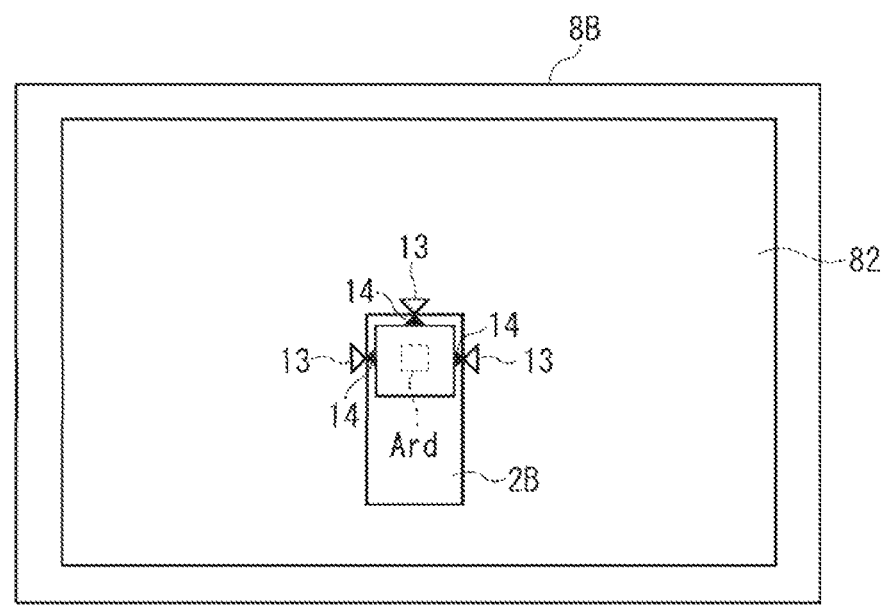
FIG. 9 is a front view for explaining an installation method of the image display device and the spectroscopic measurement device.

After the measurement position marks 13 are displayed on the display section 82, the user disposes the spectroscopic measurement device 2B on the display section 82 of the image display device 8B. As shown in FIG. 9, on the surface of the exterior case 25, on which the display section 23 of the spectroscopic measurement device 2B is disposed, there are disposed alignment marks 14 for arranging the spectroscopic measurement device 28 on the display section 82 so that the display area Ard and the imaging area of the spectroscopic measurement device 28 coincide with each other. By arranging the spectroscopic measurement device 2B so that the alignment marks 14 coincide with the measurement position marks 13, the user can arrange the spectroscopic measurement device 2B in a state in which the display area Ard and the imaging area coincide with each other.

After arranging the spectroscopic measurement device 2B on the display section 82, the user instructs the PC 7 to start the measurement. In the PC 7 having received the instruction to start the measurement, the image data output section 71 outputs the color pattern to be displayed on the display section 82 to the image display device 8B to thereby perform (step S13) the display instruction of the color pattern.

The image display device 8B, which has received the display instruction of the color pattern, displays the color pattern on the display section 82.

It should be noted that it is also possible for the PC 7 to make the color pattern be displayed and make the spectroscopic measurement device 2B start the measurement when a predetermined time has elapsed after receiving the profile generation instruction.

Meanwhile, when detecting the display on the display section 82, the spectroscopic measurement device 2B performs the spectroscopic measurement process.

In the spectroscopic measurement process by the spectroscopic measurement device 2B, firstly, the light source control section 68 determines (step S14) whether or not it is required to light the light source 22. In the step S14, whether or not there is the instruction of lighting the light source 22 by the user is determined. Alternatively, it is also possible to determine whether or not it is necessary to light the light source 22 based on the detection result by the illuminance sensor not shown.

In the case in which it is determined in the step S14 that it is necessary to light the light source 22, the light source control, section 68 supplies the light source 22 with the electric power to thereby light (step S15) the light source 22, and then, the spectroscopic measurement device 2B performs (step S16) a colorimetric process. On the other hand, in the case in which it is determined that the light source 22 will not be lit, the light source control section 68 performs (step S16) the colorimetric process without lighting the light source 22.

Colorimetric Process

Figure 10:
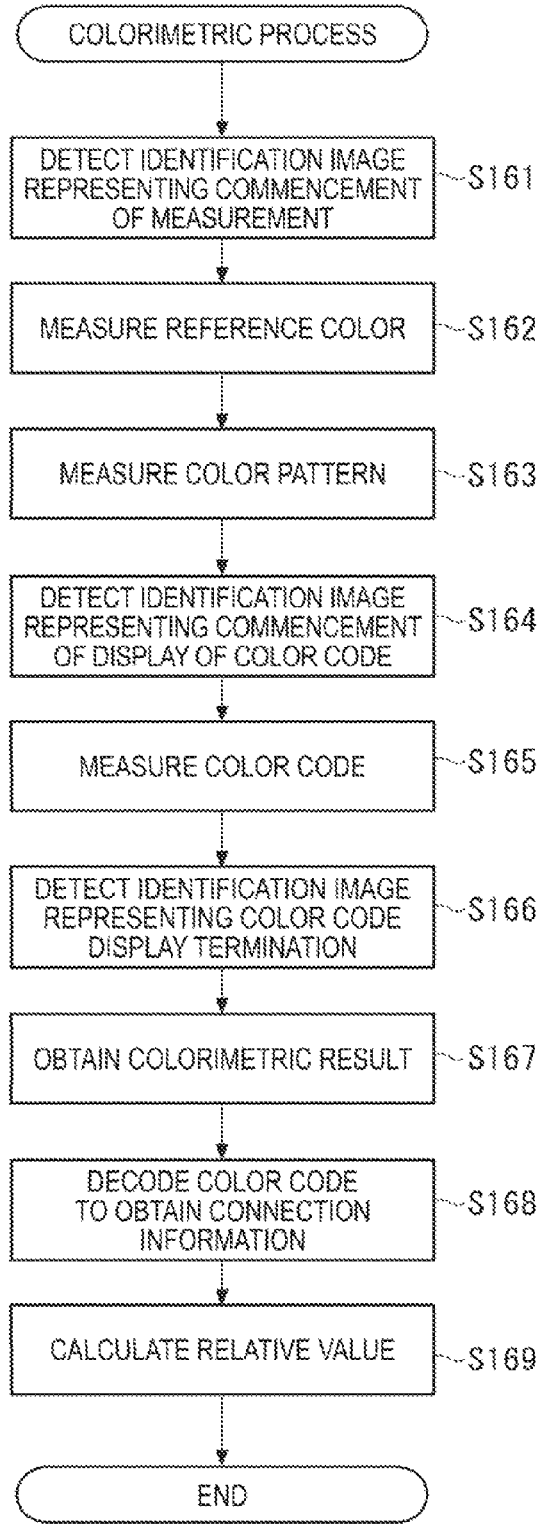
FIG. 10 is a flowchart showing a colorimetric process shown in FIG. 7.

FIG. 10 is a flowchart showing the details of the colorimetric process of the step S16 shown in FIG. 7.

When the PC 7 instructs the image display device 8B to display the color pattern in the step S13, the color patterns and the color code 10 are sequentially displayed on the display section 82 of the image display device 8B.

FIGS. 11A through 11F show images to be displayed on the display section 82.

It should be noted that the color patterns and the color code 10 are displayed for a predetermined measurement time necessary for the spectroscopic measurement device 2B to obtain the measurement data.

Figure 11A:
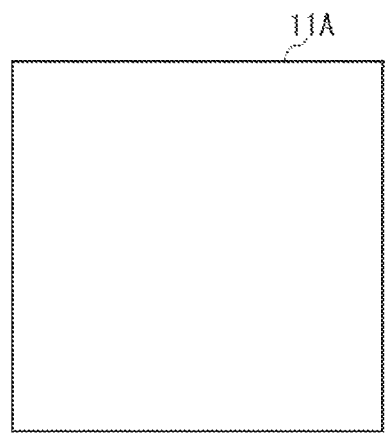
FIGS. 11A through 11F are diagrams showing a measurement object.

Firstly, the identification image 11A is displayed in the display area Ard (see FIG. 11A). The identification image 11A shown in FIG. 11A is an image for displaying white, which is a reference color with the RGB value (R, G, B)=(255, 255, 255).

At the time point when the identification image 11A is displayed, the spectroscopic measurement device 2B has not yet started the measurement. Therefore, the variable wavelength interference filter 5 is in a standby state, and the dimension of the inter-reflecting film gap G1 is set to an initial gap dimension. When the identification image 11A is displayed, the light with the wavelength corresponding to the initial gap dimension described above is detected in the entire surface of the imaging element 32 through the variable wavelength interference filter 5.

As shown in FIG. 10, the identification image detection section 65 detects (step S161) the fact that the image presently displayed is the identification image 11A based on the light receiving pattern in the pixels of the imaging element 32.

When the identification image detection section 65 detects the identification image 11A, the spectroscopic measurement device 2B starts the spectroscopic measurement taking the detection of the identification image 11A as a trigger, and then measures (step S162) the reference color.

Specifically, the drive voltage is applied to the electrostatic actuator 56, and the inter-reflecting film gap G1 is changed to the dimension corresponding to the drive voltage. Then, the light with the measurement wavelength is transmitted through the variable wavelength interference filter 5, and detected by the imaging element 32, and thus, the filter control section 61 obtains the spectral image of the measurement wavelength, and then the received light intensity and the pixel position are stored in the storage section 20 so as to be associated with each other. Similarly, by obtaining the spectral images with respect to all of the measurement wavelengths, the reference color datum based on the identification image 11A is stored.

In other words, in the present embodiment, the identification image 11A is also used as a reference color image according to the invention for displaying the reference color. It should be noted that the reference color datum is obtained from the measurement result of the reference color, and then the measurement data are corrected using the reference color datum as the reference.

Figure 11B:
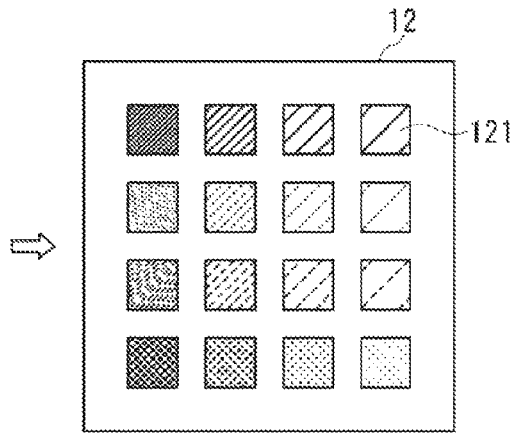
Figure 11C:
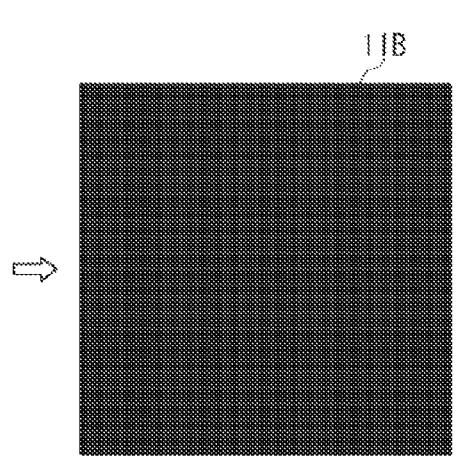

After displaying the identification image 11A for a predetermined measurement time, the color pattern 12 is displayed (see FIG. 11B). The color pattern 12 includes a plurality of color patches 121 arranged in a matrix and displayed in the imaging area of the spectroscopic measurement device 2B.

In the case in which the target of the generation of the profile is the image display device 8B provided with the display section 82 as one of a variety of types of displays as in the present embodiment, the plurality of color patches 121 includes color patches corresponding respectively to all of the colors necessary to figure out the display characteristics of the image display device 8B having the RGB values (R, G, B)=(0, 0, 0) through (255, 255, 255), namely the predetermined colors having respective grayscales different from each other. The dimension of a side of the color pattern 12 is roughly in a range of, for example, 1 mm through 10 mm, and each of the color patches 121 is displayed using a plurality of pixels of the display section 82.

The spectroscopic measurement device 2B measures the color pattern 12 similarly to the identification image 11A, and the spectral images of all of the measurement wavelengths are obtained (step S163).

It should be noted that the color pattern is displayed for a predetermined measurement time necessary for the spectroscopic measurement device 2B to obtain the measurement data.

When a predetermined time has elapsed, an identification image 11B for giving notice of the display of the color code 10A is then displayed. The identification image 11B is, for example, an image for displaying black corresponding to the RGB value (R, G, B)=(0, 0, 0) (see FIG. 11C). The spectroscopic measurement device 2B detects the fact that the identification image 113 has been displayed to thereby detect (step S164) the fact that the color code 10A will be displayed.

Figure 11D:
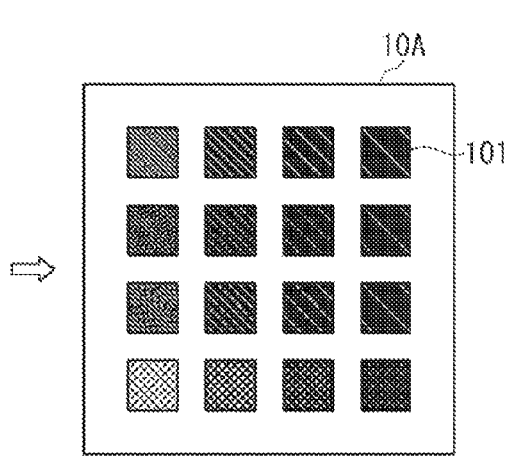
Figure 11E:
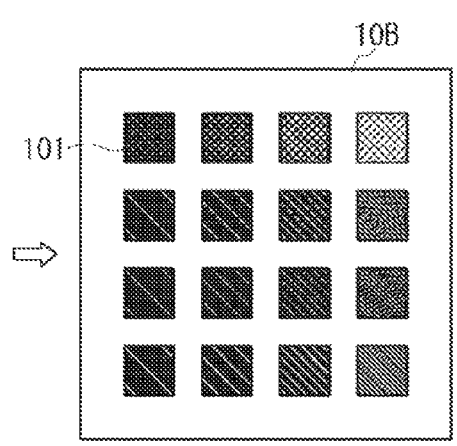

After displaying the identification image 11B for a predetermined time, the color codes 10A, 10B are displayed sequentially (see FIGS. 11D and 11E). The color codes 10A, 10B are each obtained by converting the connection information into a two-dimensional color code. Although in the present embodiment, there is described an example of displaying a single piece of the connection information with the two color codes 10A, 10B, it is also possible to adopt a configuration of, for example, transmitting the connection information with a single color code, or a configuration of transmitting the connection information with three or more color codes.

The spectroscopic measurement device 2B applies the drive voltage to the electrostatic actuator 56 at the timing when the display of the color code 10A is started, then performs the measurement of the color code 10A to obtain (step S165) the spectral images of all of the measurement wavelengths. Further, the spectroscopic measurement device 2B performs the measurement of the color code 11B displayed subsequently in substantially the same manner to obtain the spectral images of all of the measurement wavelengths. It should be noted that regarding the measurement of the color code, since substantially the same process as in the first embodiment described above is adopted, the explanation will be omitted here.

Figure 11F:
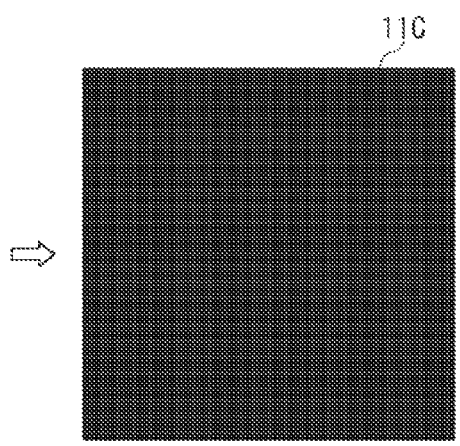

After the color code 10B is displayed for a predetermined measurement time, an identification image 11C for giving notice of the termination of the display of the color codes 10A, 10B is displayed (see FIG. 11F).

The spectroscopic measurement device 2B detects the fact that the identification image 11C has been displayed to thereby detect (step 3166) the termination of the display of the color codes 10A, 10B. It should be noted that the identification image 11B for making the start of the display of the color code be detected and the identification image 11C for making the termination thereof be detected can be different from each other.

Then, by calculating the dispersion spectrum of each of the pixels of the color codes 10A, 10B from the spectral images of all of the measurement wavelengths, which are the measurement result of the color codes 10A, 10B, the measurement result is obtained (step S167).

Then, the decode section 64 decodes the color codes 10A, 10B with reference to the dispersion spectrum in the pixel positions corresponding to each of the code patches of the color codes 10A, 10B using the measurement result of the color codes 10A, 10B thus obtained to thereby obtain (step S168) the connection information. The spectroscopic measurement device 2B stores the connection information thus obtained in the storage section 20.

Subsequently, the relative value acquisition section 67 calculates (step S169) the relative value from the measurement datum at each of the pixel positions of the spectral image of the color pattern 12 taking the measurement datum at each of the pixel positions of the reference color datum thus obtained as a reference, and then stores the relative value thus calculated so as to be associated with the measurement datum of each of the pixels.

Subsequently, going back to FIG. 7, the communication section 21 of the spectroscopic measurement device 2B establishes (step S17) the connection to the PC 7 using the connection information thus obtained.

Then, the spectroscopic measurement device 2B outputs (step S18) the measurement data and the relative values stored in the storage section 20 from the communication section 21 to the PC 7 as the profile-generating datum.

When receiving (step S19) the profile-generating datum from the spectroscopic measurement device 2B, the PC 7 generates (step S20) the profile of the image display device 8B, and then outputs (step S21) the profile thus generated to the image display device 8B using the profile output section 72. The profile is generated using, for example, the averaged measurement datum, which is obtained by calculating an average value of the received light intensity at the pixel positions, where the same color patch 121 is measured, in the measurement data of the color pattern 12.

It should be noted that the display control section 811 of the image display device 8B having received the profile performs the color adjustment of the display section 82 using the profile datum.

Functions and Advantages of Second Embodiment

In the color management system 1B according to the present embodiment, the PC 7 makes the image display device 8B display the connection information as the color codes 10A, 10B. The spectroscopic measurement device 2B performs the spectroscopic measurement of the color codes 10A, 10B to obtain the spectral images at a plurality of wavelengths. Then, the dispersion spectrum of each of the pixels is calculated from the spectral images thus obtained, and then the color codes 10A, 10B are decoded based on the dispersion spectrum to thereby obtain the connection information. Then, when outputting the profile-generating datum obtained separately to the PC 7, the spectroscopic measurement device 28 establishes the connection to the PC 7 using the connection information described above. The PC 7 generates the profile of the image display device using the profile-generating datum.

Thus, the wireless communication can easily be established between arbitrary spectroscopic measurement device and profile generation device without making the spectroscopic measurement device 2B and the PC 7 (the profile generation device) perform setting of the communication to perform the wireless communication with each other, or connecting the spectroscopic measurement device 2B and the PC 7 to each other with wire.

Further, a number of colors can simultaneously be measured, and thus, reduction of the time necessary for the measurement and the generation of the profile can be achieved.

Further, since the measurement datum is the accurate dispersion spectrum of the measurement object X displayed, the profile with high color reproducibility with respect to the original image can be generated using such a measurement datum.

Further, since the colorimetric process in the spectroscopic measurement device 2B can promptly be performed, the time necessary to generate the profile can also be reduced.

In the color management system 1B according to the present embodiment, the color codes 10A, 10B are obtained by dividing and then encoding the single transmission datum, and are displayed sequentially. As described above, in the present embodiment, the color codes 10A, 10B are displayed as video pictures, and the code pattern 101 varies with time. On the other hand, the spectroscopic measurement device 2B measures each of the color codes 10A, 10B varying with time, and decodes the data corresponding respectively to the color codes 10A, 10B. Thus, transmission of a datum with a large data size, continuous transmission of a plurality of data, and so on become possible.

In the color management system 1B according to the present embodiment, by displaying the identification images 11A, 11B, it is possible to correctly identify whether the image displayed presently is the color pattern 12 used for generating the profile or the color code 10 for the communication, and thus, the process corresponding to the type of the image can correctly be performed.

In the color management system 1B according to the present embodiment, the identification image 11A representing the commencement of the display of the color pattern 12 is displayed prior to the display of the color pattern 12. Further, the identification image 11B representing the commencement of the display of the color code 10A is displayed prior to the display of the color code 10A.

Thus, it is unnecessary to instruct the spectroscopic measurement device 2B to start the measurement in accordance with the display timing of the color pattern 12 of the image display device 8B. In other words, the measurement can be performed even if the spectroscopic measurement device 2B and the image display device 8B fail to be synchronized with each other.

Further, in the color management system 1B according to the present embodiment, after terminating the display of the color code 10B, the identification image 11C representing the termination of the display of the color code 10B is displayed, and at the same time, the spectroscopic measurement device 2B is made to detect the termination of the measurement.

Therefore, since it is not required to synchronize the timing of the termination of the measurement between the spectroscopic measurement device 2B and the image display device 8B, it is possible for the user to generate the profile by such a simple operation as to arrange the spectroscopic measurement device 2B at the display position of the color pattern 12, and to instruct the image display device 88 to display the color pattern 12. Further, it is possible to make the spectroscopic measurement device 2B terminate the measurement without setting the number of color patterns 12 as the measurement object in advance, and it is possible to make the spectroscopic measurement device 2B measure an arbitrary number of color patterns 12 as required to thereby enhance the versatility.

In the color management system 1B according to the present embodiment, since the color pattern 12 has the color patches 121 each having a predetermined size arranged in a matrix, the position of the color patch 121 in the color pattern 12 can easily be identified.

In the color management system 1B according to the present embodiment, the color pattern 12 having the reference color (e.g., the white color) displayed between the color patches 121 is imaged to obtain the measurement datum based on the reference color and the measurement data based on the color patches 121, and then the profile-generating datum taking the measurement datum based on the reference color as a reference is output. For example, it is possible to output the colorimetric result of the color patch 121 as the relative value taking the measurement value of the reference color as a reference, and by outputting such a relative value, the profile best suited to the image display device can accurately be generated.

Further, in the color management system 1B according to the present embodiment, since the spectral image of the color pattern 12 is obtained, by using the reference color adjacent to the color patch 121, the influence of the in-plane characteristics (e.g., a characteristic difference between the pixels of the imaging element, a variation in gap dimension between the reflecting films in the Fabry-Perot etalon, and a variation in thickness of the reflecting films) is difficult to be exerted. Therefore, in such a spectroscopic measurement device 2B according to the present embodiment as to take the spectral image obtained by the integral-field spectroscopy, improvement in measurement accuracy can be achieved.

In the color management system 1B according to the present embodiment, the relative value acquisition section 67 calculates the relative value of the measurement datum of the color patch 121 at the pixel position taking the measurement datum of the reference color thus identified at the same pixel position as a reference. Thus, the profile output section 72 can generate the profile best suitable for displaying the color of the original image on the display section 82 with high reproducibility based on the measurement datum and the relative value with respect to each of the color patches 121.

Further, in the present embodiment, the relative value between the measurement datum at each of the pixels of the identification image 11A displayed with the reference color and the measurement datum at each of the pixels of the color pattern 12 is calculated. Therefore, the influences of the in-plane characteristics (e.g., the inter-reflecting film gap G1, the film thickness and the film characteristics of the reflecting films 54, 55, and the characteristic difference between the pixels of the imaging element 32) of the variable wavelength interference filter 5 and the imaging element 32 are difficult to be exerted, and the optimum profile excluding the characteristic difference between the pixels can be generated.

In the color management system 1B according to the present embodiment, the image data output section 71 makes the measurement position marks 13 for indicating the arrangement position of the spectroscopic measurement device 2B be displayed. Thus, it becomes easy to arrange the spectroscopic measurement device 2B at the position where the imaging area of the spectroscopic measurement device 2B and the display area Ard of the measurement object X overlap each other, and the colorimetry with high accuracy can easily be performed.

It should be noted that although in the present embodiment, the color code and the color patterns are displayed sequentially, the invention is not limited to this configuration, but it is also possible to display the color codes and the color patterns at the same time in respective areas different from each other.

Thus, since the color codes and the color patterns can be measured at the same time, the colorimetry can promptly be performed, and therefore, the time necessary to generate the profile can also be reduced.

Although in the embodiment described above, there is explained the color management system 1B, which outputs the profile of a single image display device 8B, and makes the color adjustment of the image display device 8B be performed, the invention is not limited to this configuration, but it is also possible to perform color matching between a plurality of image display devices.

Although in the present embodiment, it is arranged that a single type of the color pattern 12 used for generating the profile is displayed alone, it is also possible to arrange that a plurality of color patterns 12 is displayed sequentially.

In this case, by sequentially displaying the plurality of color patterns 12 different in arrangement positions of the color patches 121 from each other, the variation in light receiving sensitivity between the pixels of the spectroscopic measurement device and the variation in color reproducibility between the pixels of the image display device can be averaged.

That is, in some cases, the image display device may have a variation in color reproducibility between the display positions. Further, in some cases, the light receiving section may have a variation in light receiving sensitivity between the light receiving positions. Therefore, by displaying the same color at different display positions, and receiving the same color by the light receiving elements at different pixel positions, there can be obtained the profile-generating datum in which the variation in color reproducibility between the display positions of the image display device and the variation in light receiving sensitivity between the light receiving positions of the light receiving section are averaged, and thus, the S/N ratio can be improved.

Although in the present embodiment, it is assumed that the communication section 21 performs the communication with the wireless communication, the communication section 21 can also perform the communication with wired communication via a LAN or the like.

Further, although in the present embodiment, the white lines are disposed between the color patches 121, black lines can also be disposed between the color patches 121. By disposing the black lines between the color patches 121, the light from the adjacent color patch 121 can be separated, and thus, the colorimetric accuracy can be improved.

Although in the present embodiment, the identification image representing the commencement of the display of the color pattern 12 and the color code 10 is displayed to identify the type of the image presently displayed, the invention is not limited to this configuration, but it is also possible to arrange that the identification image is displayed in a predetermined area such as the periphery or a part of the color pattern to identify the type of the color pattern.

Although in the embodiment, the reference color image with the reference color is displayed as the identification image, the invention is not limited to this configuration. That is, any image, which can be identified by the spectroscopic measurement device, can be used as the identification image, and specifically, any image emitting the light including the wavelength (a preset wavelength), which can be transmitted through the variable wavelength interference filter 5 in the standby state of the spectroscopic measurement device 2B, can be adopted. Further, although it is assumed that the image for displaying the reference color in the entire area of the display area Ard is displayed for a predetermined period of time as the identification image, it is also possible to intermittently display (blink) the image for emitting the light including the preset wavelength, or to display a predetermined pattern such as stripes.

Although in the embodiment, the profile-generating datum having the relative values associated with the measurement datum is output, the invention is not limited to this configuration, but it is also possible to output only the measurement data based on the color patches as the profile-generating datum. In this case, it is not required to provide the position identification section 66 for obtaining the reference color datum of the reference color and the relative value acquisition section 67 for obtaining the relative value of the measurement data with respect to the reference color datum.

Although in the embodiment, it is assumed that the plurality of marks each having a triangular shape is displayed as the measurement position marks 13 for indicating the arrangement position of the spectroscopic measurement device 2B on the display section 82, the invention is not limited to this configuration. The number and the shapes of the measurement position marks 13 are not particularly limited, and any number and any shapes can be adopted providing the arrangement position of the spectroscopic measurement device 2B can be indicated. Further, if the arrangement position of the spectroscopic measurement device 2B can be specified, it is not necessarily required to display the measurement position marks 13.

Further, although it is assumed that the alignment marks 14 for adjusting the position of the spectroscopic measurement device 28 with respect to the measurement position marks 13 are disposed on the surface of the exterior case 25 of the spectroscopic measurement device 28, it is not necessarily required to provide the alignment marks 14.

Third Embodiment

Then, a third embodiment of the invention will be explained with reference to the accompanying drawings.

Configuration of Communication System

Figure 12:
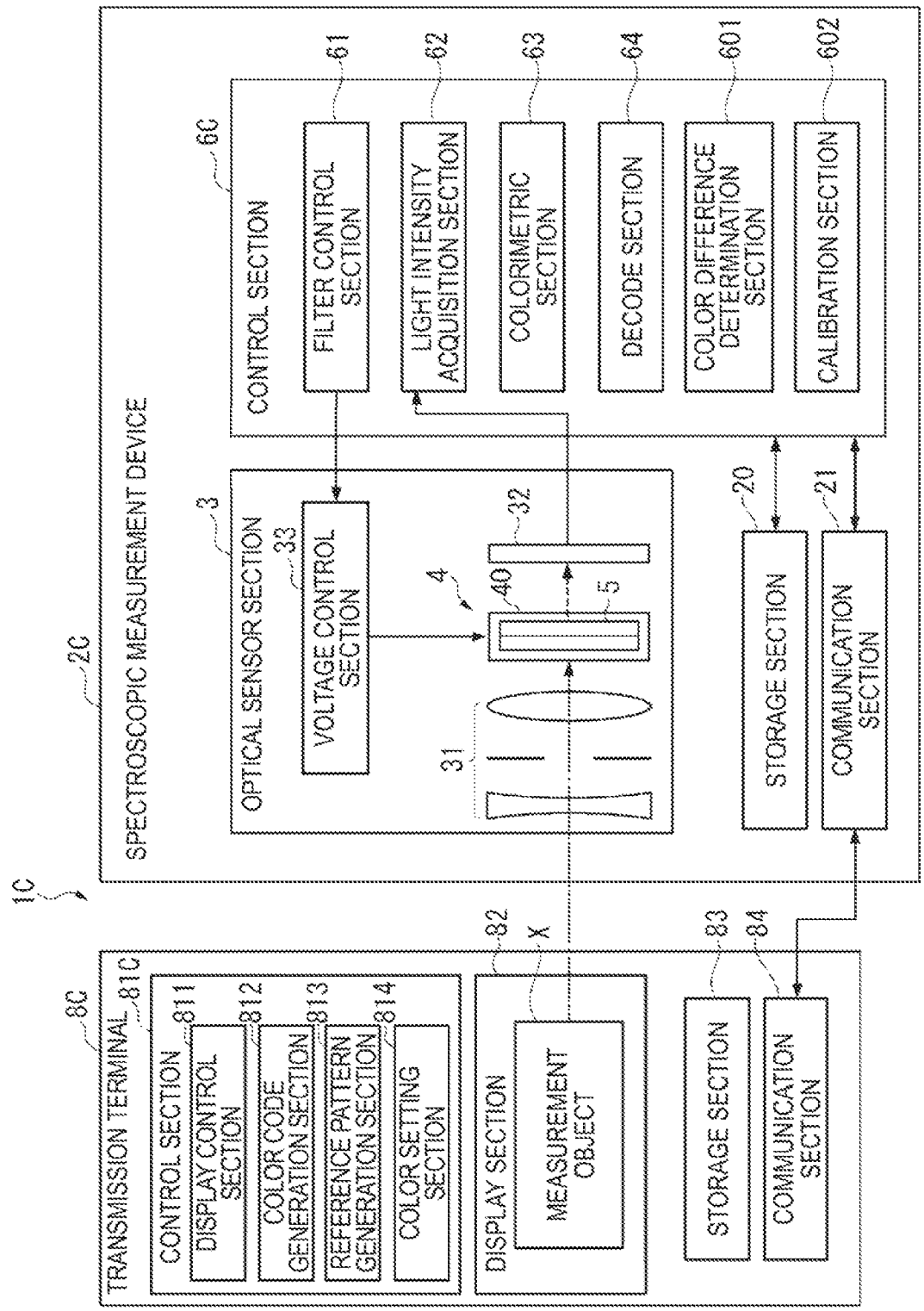
FIG. 12 is a block diagram showing a schematic configuration of a communication system according to a third embodiment of the invention.

FIG. 12 is a block diagram showing a configuration of a communication system 1C according to an embodiment of the invention.

The communication system 1C according to the present embodiment is provided with a spectroscopic measurement device 2C and a transmission terminal 8C. Similarly to the spectroscopic measurement device 2 and the transmission terminal 8 according to the first embodiment, the spectroscopic measurement device 2C and the transmission terminal 8C are configured so as to be capable of the encode of the transmission datum and the decode of the color code 10, respectively.

In the first embodiment described above, there is described the example of making the transmission terminal 8 display the color code 10, and encoding the color code 10 using the spectroscopic measurement device 2. However, this process becomes valid in the case in which the color displayed on the transmission terminal 8 can be identified by the spectroscopic measurement device 2. In contrast, in the case in which the color displayed on the transmission terminal 8C cannot be identified, namely in the case in which the color information provided to the transmission terminal 8 and the color information provided to the spectroscopic measurement device 2 are different from each other, there is a case in which the color displayed on the transmission terminal 8 and the color determined by the spectroscopic measurement device 2 are different from each other, and in such a case, the color code might fail to be appropriately decoded. Therefore, in such a case, it is necessary to perform a calibration for unifying the colors, which can be identified in the transmission terminal 8 and the spectroscopic measurement device 2. In the present embodiment, there are explained a configuration and a process for performing such a calibration and then performing, for example, the communication using the color code.

It should be noted that in the present embodiment, the constituents substantially the same as those of the first embodiment are denoted with the same reference symbols, and the explanation thereof will be omitted or simplified.

Configuration of Transmission Terminal

The transmission terminal 8C is provided with a control section 81C, a display section 82, a storage section 83, and a communication section 84, and makes the display section 82 display the color code 10 obtained by encoding the transmission datum. Further, a reference color pattern for performing the color calibration between the spectroscopic measurement device 2C and the transmission terminal 8C is made to be displayed. The transmission terminal 8C corresponds to the image display device according to the invention.

Further, the control section 81C is provided with the display control section 811, the color code generation section 812, a reference pattern generation section 813, and a color setting section 814.

The reference pattern generation section 813 generates a reference color pattern for performing the color calibration between the spectroscopic measurement device 2C and the transmission terminal 8C.

The reference color pattern is basically similar to the color pattern 12 used for generating the profile explained in the above description of the embodiment, and has color patches (reference color patches) corresponding respectively to a predetermined number of colors (the dispersion spectrum)

arranged in a predetermined order. For example, color patterns sequentially displaying 256 grayscale colors are used.

It should be noted that the predetermined number of colors are the initial setting of the colors of the reference color patches, which are available when generating the color pattern and the color code 10.

The color setting section 814 sets the colors used when the color code generation section 812 generates the color code 10. In the present embodiment, in the case in which the spectroscopic measurement device 2C measures the reference color pattern, and as a result, there is a color which cannot be identified, the color setting section 814 sets the number and the types of the colors, which are used when the color code generation section 812 and the reference pattern generation section 813 generate the color pattern, in response to the notification from the spectroscopic measurement device 2C.

Configuration of Spectroscopic Measurement Device

The spectroscopic measurement device 2C is provided with the optical sensor section 3, a control section 6C, the storage section 20, and the communication section 21.

As explained in the description of the second embodiment, the communication section 21 performs the communication with the external device. In the present embodiment, in particular, in the case in which the communication with the transmission terminal 8C is possible, information related to the color, which cannot be identified, is transmitted.

The control section 6C is provided with the filter control section 61, the light intensity acquisition section 62, the colorimetric section 63, the decode section 64, a color difference determination section 601, and a calibration section 602.

The color difference determination section 601 compares the dispersion spectrums of the respective reference color patches, which have been obtained by performing the spectroscopic measurement on the reference color pattern, with each other, and then determines whether or not the dispersion spectrums corresponding to the respective reference color patches can be determined to be colors different from each other.

Further, in the case in which the dispersion spectrums cannot be determined to be the colors different from each other, the color difference determination section 601 instructs the filter control section 61 to decrease the measurement wavelength intervals. The filter control section 61 newly sets the measurement wavelengths so that the measurement wavelength intervals are decreased in accordance with the instruction.

Further, the color difference determination section 601 transmits a color change request, which requests the change in colors of the reference color patches constituting the reference color pattern, to the transmission terminal 8C.

The calibration section 602 performs the calibration between the color information of the transmission terminal 8C and the color information of the spectroscopic measurement device 2C. Specifically, the calibration section 602 associates the dispersion spectrum of each of the reference color patches of the reference color pattern and the color information with each other, and then stores the dispersion spectrums and the color information in the storage section 20 as calibration information. Since which color of the reference color patch is displayed at which position in the reference color pattern is known information, the color information can be identified from the pixel position where the dispersion spectrum is detected. The calibration information stored is used when performing the decode.

Action of Communication System

Figure 13:
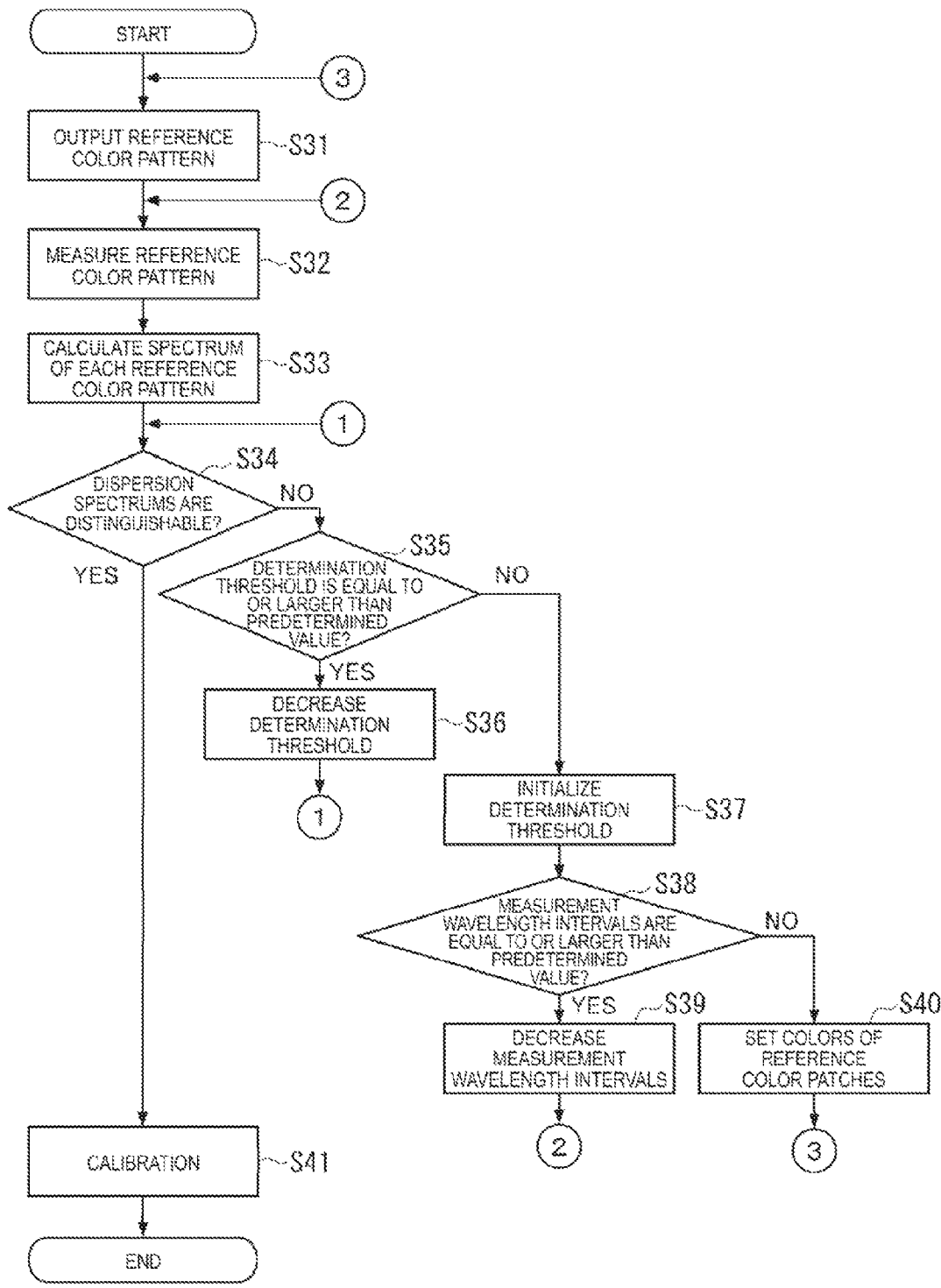
FIG. 13 is a flowchart showing a calibration process.

FIG. 13 is a flowchart showing an action of the communication system 1C. It should be noted that FIG. 13 shows the calibration process, which is executed prior to the communication via the color code 10.

As shown in FIG. 13, when the transmission datum is selected by an operation by the user, and the transmission terminal 8C receives an instruction of data transmission, the transmission terminal 8C displays (step S31) the reference color pattern on the display section 82.

When the reference color pattern is displayed on the display section 82, the spectroscopic measurement device 2C measures (step S32) the reference color pattern in accordance with the operation of the user to obtain the spectral images at predetermined measurement wavelengths (wavelength intervals). The spectral image thus obtained is stored in the storage section 20 so as to be associated with the measurement wavelength.

When obtaining the spectral images at all of the measurement wavelengths, the colorimetric section 63 calculates (step S33) the dispersion spectrum (the color information of each of the reference color patches) of each of the reference color patches using the pixel positions, the light intensity values, and the measurement wavelengths obtained from each of the spectral images thus obtained and stored in the storage section 20.

Then, the color difference determination section 601 determines (step S34) whether or not the dispersion spectrums of the respective color patches can be distinguished from each other, namely whether or not the color of each of the reference color patches can be determined to be different from the colors of other color patches.

Specifically, the color difference determination section 601 compares the dispersion spectrums obtained by performing the colorimetry on the respective reference color patches with each other, and then determines whether or not the light intensity difference between the respective dispersion spectrums with respect to each of the wavelengths is equal to or smaller than a determination threshold value. For example, the light intensity difference between a first dispersion spectrum corresponding to a first color patch and a second dispersion spectrum corresponding to a second color patch with respect to each of the wavelengths is calculated. Then, in the case in which all of the light intensity differences corresponding respectively to the wavelengths are equal or smaller than the determination threshold value, the first dispersion spectrum and the second dispersion spectrum are determined to be indistinguishable from each other. In contrast, in the case in which the light intensity difference is larger than the determination threshold value in either of the wavelengths, the dispersion spectrums are determined to be distinguishable from each other.

It should be noted that if the determination threshold value is too large, there is a possibility that the reference color patches displayed with respective colors different from each other are determined to be the same color. On the other hand, if the determination threshold value is too small, there is a possibility that the dispersion spectrums are determined to be the colors different from each other due to the color reproducibility of the transmission terminal 8C, a measurement error of the spectroscopic measurement device 2C, and so on despite the reference color patches are displayed with the same color.

Taking the above points into consideration, the initial value of the determination threshold is set previously to at least equal to or larger than a width necessary to determine all of the color types in view of the initial setting of the color types (the number of colors) when generating the reference color pattern, the variation in color reproducibility of the transmission terminal 8C, and so on.

It should be noted that although in the determination method described above, the light intensity difference between the dispersion spectrums at each of the wavelengths is calculated, and is then compared with the determination threshold value, the invention is not limited to this procedure. In the case in which, for example, the dispersion spectrums corresponding to the colors displayed as the respective reference color patches are known, it is also possible to determine whether or not the colors of the respective reference color patches can be determined in such a manner as described below.

Figure 14:
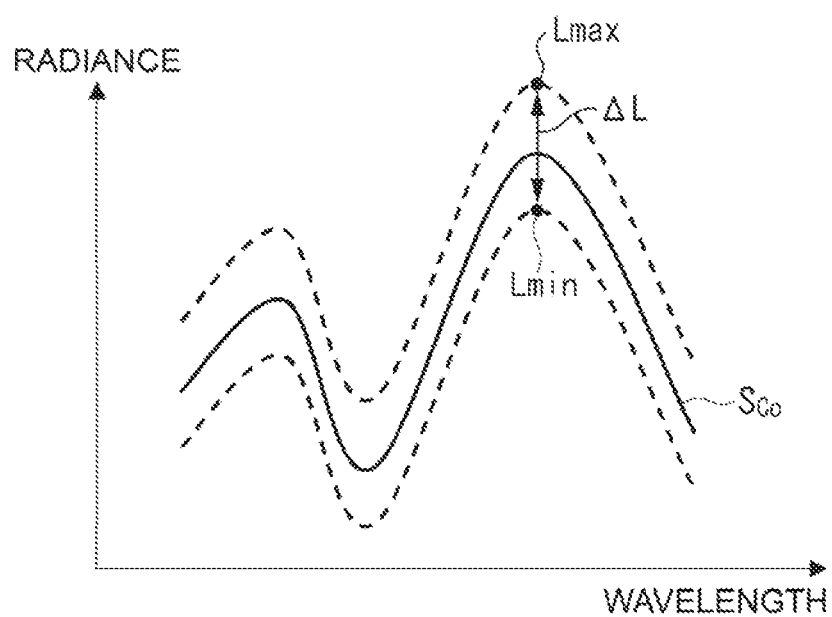
FIG. 14 is a diagram for explaining a modified example of an identification method of a dispersion spectrum.

FIG. 14 is a diagram for explaining another example of the identification method of the dispersion spectrum. As shown in FIG. 14, centering an ideal dispersion spectrum $S_{Co}$ (hereinafter also referred to as an ideal spectrum $S_{Co}$) presented by a certain color Co, there are set the upper limit value Lmax and the lower limit value Lmin of the light intensity value in each of the wavelengths for determining that a color is the same as the color Co. The color difference determination section 601 determines that the dispersion spectrum included in an area between the upper limit value Lmax and the lower limit value Lmin is the same dispersion spectrum as the ideal spectrum $S_{Co}$, namely the same color.

Further, in the case in which the color difference determination section 601 determines that a different color cannot be distinguished, the color difference determination section 601 changes the width ΔL (i.e., the determination threshold value) between the upper limit value Lmax and the lower limit value Lmin if necessary.

Going back to FIG. 13, in the case in which the color difference determination section 601 determines that some of the dispersion spectrums of the respective color patches cannot be determined (NO in the step S34), whether or not the determination threshold value is equal to or larger than a predetermined value is determined (step S35). That is, there is a possibility that the dispersion spectrum of each of the reference color patches cannot be determined because the present determination threshold value is large. In this case, it becomes possible to determine the dispersion spectrum by decreasing the determination threshold value in some cases. However, if the determination threshold is decreased to an excessively small value as described above, there is a possibility that colors are determined to be different from each other despite the fact that the colors are displayed as the same color. Therefore, in the case in which the determination threshold value is equal to or larger than the predetermined value, whether or not the dispersion spectrums are different from each other can be determined again after decreasing the determination threshold value.

It should be noted that it is sufficient to previously obtain the predetermined value described above, namely the minimum value of the determination threshold value, in accordance with the color reproducibility of the transmission terminal 8C and the colorimetric accuracy of the spectroscopic measurement device 2C using an experiment and so on.

In the case in which the determination threshold value is equal to or larger than the predetermined value (YES in the step S35), the color difference determination section 601 decreases (step S36) the determination threshold value, and then determines (step S34) again whether or not the dispersion spectrums of the respective color patches can be determined. It should be noted that the decrement amount used when decreasing the determination threshold is set previously in accordance with the color types of the reference color patches and so on.

On the other hand, in the case in which the determination threshold is smaller than the predetermined value, namely in the case in which the determination threshold value cannot be decreased (NO in the step S35), the color difference determination section 601 initializes (step S37) the determination threshold value, and then determines (step S38) whether or not the measurement wavelength intervals are equal to or longer than a predetermined length (e.g., 1 nm). The predetermined length is, for example, the minimum value of the measurement wavelength interval, with which the variable wavelength interference filter 5 can be controlled in good condition.

In the case in which the measurement wavelength intervals are equal to or larger than the predetermined length (YES in the step S38), since the measurement wavelength interval can be decreased, the color difference determination section 601 decreases (step S39) the measurement wavelength intervals. Specifically, the color difference determination section 601 determines the measurement target wavelengths so that the measurement wavelength intervals are decreased from 20 nm to 10 nm, and then sets the measurement target wavelengths to the filter control section 61.

Then, the process returns to the step S32, the reference color pattern is measured again, and then the process of the steps S33 through S37 is performed.

In contrast, in the case in which the measurement wavelength intervals are shorter than the predetermined length (NO in the step S38), since the measurement wavelength intervals cannot be decreased, it is not preferable to further decrease the measurement wavelength intervals, and therefore, the color of the reference color patch is newly set (step S40).

Specifically, the color difference determination section 601 detects the dispersion spectrum and the pixel position of the determinable pixel from the dispersion spectrums, and then transmits information for giving a notice of the pixel position (the determinable color) where the dispersion spectrum is measured, and an instruction of the color change to the transmission terminal 8C as a display color change request. It should be noted that color identification information can be one related to an indeterminable color.

The color setting section 814 of the transmission terminal 8C sets the colors of the color patches so as to eliminate the indeterminable color using the color identification information. For example, the color setting section 814 sets the colors of the color patches within a range except the indeterminable color. Further, it is also possible to set the colors so as to reduce the number of colors. For example, 256 grayscales is changed to 128 grayscales. It should be noted that on this occasion, it is also possible to simply transmit only the instruction of the color change to the transmission terminal 8C as the display color change request.

Then, the transmission terminal 8C generates the reference color pattern composed of the newly set colors, and then displays (step S31) the reference color pattern. The communication system 1C repeatedly performs the steps S31 through S40 until it becomes possible to determine the dispersion spectrums (YES in the step S34).

In the case in which the dispersion spectrums can be determined (YES in the step S34), the calibration section 602 stores the dispersion spectrums of the respective reference color patches of the reference color pattern and the color information in the storage section 20 so as to be associated with each other. Since which color of the reference color patch is displayed at which position in the reference color pattern is known information, the color information can be identified from the pixel position where the dispersion spectrum is detected. The calibration between the color information of the transmission terminal 8C and the color information of the spectroscopic measurement device 2C is performed in such a manner as described above.
Functions and Advantages of Third Embodiment In the communication system 1C according to the present embodiment, by performing the color calibration using the calibration color pattern, the colorimetric characteristics of the spectroscopic measurement device 2C can be made to coincide with those of the transmission terminal 8C, the color code 10 displayed can accurately be decoded, and the communication can be performed.

That is, in the case in which the colorimetric characteristics of the spectroscopic measurement device 2C and the output characteristics of the transmission terminal 8C do not coincide with each other, there is a possibility that the color code 10 cannot accurately be decoded.

In contrast, by performing the calibration using the calibration color pattern, the communication can more reliably be performed.

In the communication system 1C according to the present embodiment, the color difference determination section 601 determines that all of the dispersion spectrums existing within the determination threshold value to be the same dispersion spectrum. Further, in the case in which any indeterminable dispersion spectrum exists, the color difference determination section 601 decreases the determination threshold value ΔL.

Thus, the dispersion spectrum, which has been indeterminable before decreasing the determination threshold value ΔL, can be made determinable, and the setting can be changed so that the decode of the color code 10 can be performed even in the case in which the color code 10 cannot be decoded in the initial setting.

In the communication system 1C according to the present embodiment, in the case in which the dispersion spectrum is determined to be indeterminable, the measurement wavelengths are newly set so that the measurement wavelength intervals are decreased.

Thus, since the dispersion spectrums can be obtained at smaller wavelength intervals than those of the dispersion spectrums used when determining whether or not the dispersion spectrums are determinable, the setting can be changed so that the decode of the color code 10 can be performed even in the case in which the color code 10 cannot be decoded in the initial setting.

In the communication system 1C according to the present embodiment, in the case in which the dispersion spectrum is determined to be indeterminable, the spectroscopic measurement device 2C detects the determinable dispersion spectrum (or the indeterminable dispersion spectrum). Then, the transmission terminal 8C sets the colors of the color code 10 and the color patterns based on the detection result. Thus, the setting of the image display device can be changed so as to display the color code 10 and the color patterns using only the determinable colors, and thus, the decode can be performed.

It should be noted that although in the present embodiment, the spectroscopic measurement device 2C and the transmission terminal 8C are configured to be able to communicate with each other, and the transmission terminal 8C is configured so as to change the colors of the reference color pattern in response to the color change request from the spectroscopic measurement device 2C, the invention is not limited to this configuration. The transmission terminal 8C can also be configured so as to change the colors based on an operation by the user in the case in which it is determined by the spectroscopic measurement device 2C that the color change is necessary. It should be noted that in this case, it is not necessarily required to configure the spectroscopic measurement device 2C and the transmission terminal 8C so as to be able to communicate with each other.

Although in the description of the present embodiment, the communication system 1C performing the calibration process described above is explained as an example, the invention is not limited to this example, but it is also possible to apply the calibration process described above to the color management system 1E explained in the description of the second embodiment.
Other Modified Examples It should be noted that the invention is not limited to each of the embodiments described above, but includes modifications, improvements, and so on within a range where the advantages of the invention can be achieved.

For example, although in the description of the first embodiment, the tablet terminal is described as an example of the transmission terminal 8 as shown in FIG. 4, the invention is not limited to this example. For example, as the transmission terminal, there can be used a variety of types of image display devices capable of outputting the color code, such as a variety of types of displays, a projector, and a printer. Further, the same applies to the image display device in the second and third embodiments.

Although in each of the embodiments and the modified example described above, the variable wavelength interference filter 5 is used as the spectral filter, the invention is not limited to this configuration. It is also possible to use the spectral filter capable of performing the integral-field spectroscopy such as a liquid crystal tunable filter or an acousto-optic tunable filter (AOTF).

Although in each of the embodiments described above, the configuration of disposing the stationary reflecting film 54 as the first reflecting film on the stationary substrate 51 as the first substrate and disposing the movable reflecting film 55 as the second reflecting film on the movable substrate 52 as the second substrate is described as an example of the variable wavelength interference filter 5, the invention is not limited to this configuration. For example, a configuration not provided with the first substrate or the second substrate can also be adopted. In this case, for example, after disposing the first reflecting film on one surface of a parallel glass substrate, and disposing the second reflecting film on the other surface parallel to the one surface, the parallel glass substrate is etched using an etching process or the like. In the present configuration, the first substrate and the second substrate are eliminated, and thus, a thinner spectroscopic element can be obtained. In this case, by making, for example, a spacer intervene between the first reflecting film and the second reflecting film, the gap dimension between the reflecting films can be maintained. Further, by disposing the first electrode on the first reflecting film, disposing the second electrode on the second reflecting film, and applying the drive voltage between the first electrode and the second electrode, the gap dimension between the reflecting films can be changed.

Although in the second embodiment described above, it is assumed to provide the light source 22, in the case in which the measurement object X is limited to what is displayed on one of the variety of types of light emitting displays, the light source 22 is not necessarily required to be provided.

Although in each of the embodiments described above, it is assumed to provide the telecentric optical system 31, the invention is not limited to this configuration. Any configuration of disposing a light guide optical system capable of guiding the light from the measurement object to the spectral filter can be adopted, and for example, a configuration of disposing an LCF or the like can also be adopted.

Besides the above, specific structures to be adopted when putting the invention into practice can be configured by arbitrarily combining the embodiments and the modified examples described above, or can arbitrarily be replaced with other structures and so on within the range in which the advantages of the invention can be achieved.

The entire disclosure of Japanese Patent Application No. 2013-034264 filed on Feb. 25, 2013 is expressly incorporated by reference herein.

What is claimed is:

1. A spectroscopic measurement device comprising:
a spectral filter adapted to disperse light emitted from an object to select light with a predetermined wavelength, and capable of changing the wavelength of the light to be selected;
an imager configured to obtain a plurality of spectral images of the light dispersed by the spectral filter; and
a processor configured to:
measure a dispersion spectrum of each of a plurality of pixels in the plurality of spectral images of a plurality of wavelengths with respect to a color code having a plurality of colors of code patterns, which are emitted from the object, arranged two-dimensionally, in a case in which the plurality of spectral images are obtained;
detect an arrangement of the code patterns based on information from the dispersion spectrum of each of the plurality of pixels, and decode the color code;
determine whether or not a difference between dispersion spectrums corresponding to respective reference color patches of a plurality of colors is determinable in a case in which the processor obtains the plurality of spectral images of a plurality of wavelengths corresponding to a reference color pattern including the reference color patches emitted from the object, and measure the dispersion spectrums of respective pixels of the plurality of spectral images;
control the spectral filter to switch the wavelength of the light to be selected by the spectral filter at predetermined change intervals; and
decrease the change intervals by a predetermined length in a case in which the processor determines that the difference between the dispersion spectrums corresponding to the respective reference color patches is indeterminable.

2. The spectroscopic measurement device according to claim 1, wherein
the color code emitted from the object changes in colors of the code patterns every predetermined time, and
the processor is further configured to:
measure the dispersion spectrum of each of the plurality of pixels with respect to each of the color codes changed every predetermined time, and
decode datum corresponding to each of the color codes based on the information from the dispersion spectrum of each of the plurality of pixels with respect to each of the color codes.

3. The spectroscopic measurement device according to claim 1, wherein the processor is further configured to:
determine that a first dispersion spectrum measured with respect to a first reference color patch and a second dispersion spectrum measured with respect to a second reference color patch are indistinguishable from each other in a case in which a difference in a light intensity of each of the wavelengths between the first dispersion spectrum and the second dispersion spectrum is one of equal to and smaller than a determination threshold, and
decrease the determination threshold by a predetermined value in the case in which the processor determines that the difference between the dispersion spectrums corresponding to the respective reference color patches is indeterminable.

4. The spectroscopic measurement device according to claim 1, wherein the processor is further configured to:
detect the dispersion spectrums having a determinable difference from each other, and output pixel positions of the reference color patches corresponding to the dispersion spectrums having the determinable difference from each other to the object.

5. The spectroscopic measurement device according to claim 1, wherein
the spectral filter is a variable wavelength interference filter provided with a first reflecting film and a second reflecting film disposed so as to be opposed to the first reflecting film, and adapted to cause interference in incident light entering an area between the first reflecting film and the second reflecting film to select the light with the predetermined wavelength.

6. The spectroscopic measurement device according to claim 1, further comprising:
a telecentric optical system adapted to guide the light emitted from the object to the spectral filter.

7. The spectroscopic measurement device according to claim 1, wherein the imager is further configured to:
image each of the code patterns with a plurality of pixels.

8. A communication system comprising:
an image display device adapted to:
output a color code having a plurality of colors of code patterns arranged two-dimensionally; and
output a reference color pattern including a plurality of colors of reference color patches; and
a spectroscopic measurement device including:
a spectral filter adapted to disperse light from an image displayed on the image display device to select light with a predetermined wavelength, and capable of changing the wavelength of the light to be selected;
an imager configured to obtain a plurality of spectral images of the light dispersed by the spectral filter; and
a processor configured to:
measure a dispersion spectrum of each of a plurality of pixels in the plurality of spectral images of a plurality of wavelengths with respect to the color code, in a case in which the plurality of spectral images are obtained;
detect an arrangement of the code patterns based on information from the dispersion spectrum of each of the plurality of pixels, and decode the color code;
determine whether or not a difference between dispersion spectrums corresponding to respective reference color patches is determinable in a case in which the processor measures the dispersion spectrums of respective pixels of the plurality of spectral images;

control the spectral filter to switch the wavelength of the light to be selected by the spectral filter at predetermined change intervals; and decrease the change intervals by a predetermined length in a case in which the processor determines that the difference between the dispersion spectrums corresponding to the respective reference color patches is indeterminable.

9. The communication system according to claim 8, wherein the spectroscopic measurement device outputs a display color change request for making the display color be changed to the image display device in the case in which the processor determines that the difference between the dispersion spectrums corresponding to the respective reference color patches is indeterminable, and the image display device decreases a number of the reference color patches displayed in the reference color pattern in response to input of the display color change request.

10. The communication system according to claim 8, wherein the processor is further configured to detect the dispersion spectrums having a determinable difference from each other, and output pixel positions of the reference color patches corresponding to the dispersion spectrums having the determinable difference from each other to the image display device, and the image display device is further configured to output the color code constituting the code patterns with same colors as the colors of the reference color patches corresponding to the dispersion spectrums distinguishable from each other.

11. A color management system comprising:

a spectroscopic measurement device including:

a spectral filter adapted to disperse light from an image displayed on an image display device to select light with a predetermined wavelength, and capable of changing the wavelength of the light to be selected;

an imager configured to obtain a plurality of spectral images of the light dispersed by the spectral filter;

a first processor configured to:

measure a dispersion spectrum of each of a plurality of pixels in the plurality of spectral images of a plurality of wavelengths with respect to one of a color code having a plurality of colors of code patterns arranged two-dimensionally, and a color pattern for generating a profile, the color pattern having a plurality of colors of code patches arranged two-dimensionally, in a case in which the imager obtains the plurality of spectral images displayed on the image display device;

detect an arrangement of the code patterns based on information from the dispersion spectrum of each of the plurality of pixels with respect to the color code, and decode the color code;

determine whether or not a difference between dispersion spectrums corresponding to respective reference color patches is determinable in a case in which the first processor measures the dispersion spectrums of respective pixels of the plurality of spectral images;

control the spectral filter to switch the wavelength of the light to be selected by the spectral filter at predetermined change intervals; and decrease the change intervals by a predetermined length in a case in which the first processor determines that the difference between the dispersion spectrums corresponding to the respective reference color patches is indeterminable; and a communicator adapted to output profile-generating datum having the dispersion spectrums corresponding to the color patterns and the pixel positions, where the dispersion spectrums are measured, so as to be associated with each other; and a second processor configured to make the image display device display the color code and the color patterns, and generate a profile of the image display device using the profile-generating datum output from the spectroscopic measurement device, wherein the color code represents a datum obtained by coding a datum including an address of the second processor, and the communicator outputs the profile-generating datum to the address, which can be obtained by the first processor decoding the color code.

12. The color management system according to claim 11, wherein the spectroscopic measurement device obtains the profile-generating datum and the address based on a plurality of spectral images corresponding to the color code and the color patterns displayed at a same time in respective areas different from each other.

13. The color management system according to claim 11, wherein the second processor is further configured to output the color patterns and the color code at respective timings different from each other, and further output an identification image adapted to identify the color patterns and the color code, and the first processor is further configured to detect the identification image, and identify the color code and the color patterns in accordance with the detection result.

* * * * *